US012123560B2

(12) United States Patent
Wu et al.

(10) Patent No.: US 12,123,560 B2
(45) **Date of Patent: *Oct. 22, 2024**

(54) CONVERTIBLE LIGHT DEVICE

(71) Applicant: Good Bison, San Francisco, CA (US)

(72) Inventors: Arthur Chao-Chung Wu, Irvine, CA (US); Jarret Weis, San Francisco, CA (US); David Burns, San Diego, CA (US)

(73) Assignee: Arthur Chao-Chung Wu, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,491

(22) Filed: Nov. 15, 2023

(65) Prior Publication Data

US 2024/0084983 A1 Mar. 14, 2024

Related U.S. Application Data

(63) Continuation of application No. 17/882,420, filed on Aug. 5, 2022, now Pat. No. 11,859,783, which is a (Continued)

(51) Int. Cl.

*F21S 4/26* (2016.01)
*F21L 4/02* (2006.01)

(Continued)

(52) U.S. Cl.

CPC . *F21S 4/26* (2016.01); *F21L 4/02* (2013.01); *F21L 4/04* (2013.01); *F21S 2/005* (2013.01);

(Continued)

(58) Field of Classification Search

CPC ..... F21S 2/005; F21S 4/26; F21L 4/02; F21L 4/027; F21L 4/04; F21L 4/045; F21L 4/06; F21L 4/08; F21L 4/085

See application file for complete search history.

(56) References Cited

U.S. PATENT DOCUMENTS

| | | | | |
|---|---|---|---|---|
| 7,395,629 B1 * | 7/2008 | Thomas | A45B 3/04 43/17.5 |
| 2009/0185367 A1 * | 7/2009 | Moore | F21L 4/027 362/158 |

(Continued)

FOREIGN PATENT DOCUMENTS

KR 20160004263 U * 12/2016

OTHER PUBLICATIONS

Machine translation of KR-2016-0004263-U, published Dec. 13, 2016 (Year: 2016).*

*Primary Examiner* — William N Harris

(74) *Attorney, Agent, or Firm* — Gallium Law; Wesley Schwie; Isabel Fox

(57) ABSTRACT

The disclosure includes a convertible light device comprising a device housing, a battery pack removably coupled to the housing, and an elongate flexible light source detachably coupled to the device housing and electrically coupled to the battery pack, where the elongate flexible light source comprises a plurality of LEDs. In some embodiments, the convertible light device is configured to convert between a rope mode and a lantern mode. In the rope mode, the elongate flexible light source may be configured to extend from the device housing. In the lantern mode, the elongate flexible light source may be configured to wrap around the device housing.

20 Claims, 21 Drawing Sheets

Related U.S. Application Data continuation-in-part of application No. 17/347,363, filed on Jun. 14, 2021, now Pat. No. 11,408,568.

(60) Provisional application No. 63/039,354, filed on Jun. 15, 2020.

(51) Int. Cl.

| | |
|---|---|
| ***F21L 4/04*** | (2006.01) |
| ***F21S 2/00*** | (2016.01) |
| ***F21V 21/096*** | (2006.01) |
| ***F21V 23/04*** | (2006.01) |
| ***F21Y 103/10*** | (2016.01) |
| ***F21Y 115/10*** | (2016.01) |

(52) U.S. Cl.

CPC ...... *F21V 21/0965* (2013.01); *F21V 23/0414* (2013.01); *F21Y 2103/10* (2016.08); *F21Y 2115/10* (2016.08)

(56) References Cited

U.S. PATENT DOCUMENTS

| | | | | |
|---|---|---|---|---|
| 2010/0046211 | A1* | 2/2010 | Spartano | F21L 4/045<br>362/157 |
| 2014/0111981 | A1* | 4/2014 | Watanabe | F21L 13/06<br>362/184 |
| 2014/0321106 | A1* | 10/2014 | Workman | F21V 23/003<br>362/249.02 |
| 2017/0207429 | A1* | 7/2017 | Wang | H01M 10/488 |
| 2022/0340393 | A1* | 10/2022 | Nyfelt | B65H 75/48 |

* cited by examiner

See Fig. 10B

CONVERTIBLE LIGHT DEVICE

CROSS-REFERENCE TO RELATED APPLICATIONS

The entire contents of the following application are incorporated by reference herein: U.S. patent application Ser. No. 17/882,420; filed Aug. 5, 2022; and entitled CONVERTIBLE LIGHT DEVICE.

The entire contents of the following application are incorporated by reference herein: U.S. patent application Ser. No. 17/347,363; filed Jun. 14, 2021; issued as U.S. Pat. No. 11,408,568 on Aug. 9, 2022; and entitled CONVERTIBLE LIGHT DEVICE.

The entire contents of the following application are incorporated by reference herein: U.S. Patent Application No. 63/039,354; filed Jun. 15, 2020; and entitled CONVERTIBLE LIGHT DEVICE.

BACKGROUND

Field

Various embodiments disclosed herein relate to light devices. Certain embodiments relate to convertible light devices.

Description of Related Art

Portable lighting is a vital and immensely helpful element in many industries and activities, including construction, camping, boating, trade shows, photography, picnics, and even for emergency medical, search and rescue, and/or law enforcement use. Portable lighting is currently available in many forms ranging from small flashlights and lanterns to larger, freestanding lights. Some light sources, particularly ones that emit brighter light over a larger area, may require external power sources (e.g., generator) in order to operate.

Many of the previously mentioned forms of portable lighting emit light from a single concentrated area. While some of these lights may emit over a large area, the light emitted is still brightest at the light source and fades as the distance from the light source increases. String lights, such as those commonly used for holiday decorations, emit light over a greater area with more consistent light emission than the previously mentioned light forms. However, like other portable light sources, many string lights require external power sources. Some string lights are battery-powered, but these lights are generally very small and emit enough light for decoration, but not enough for practical use. As such, there is need for improved portable lighting that emits consistently bright light over a large area and does not require external power.

SUMMARY

The disclosure includes a convertible light device, which, in some embodiments, comprises a housing, a battery pack coupled to the housing, and an elongate flexible light source detachably coupled to the housing and electrically coupled to the battery pack, wherein the elongate flexible light source comprises a plurality of LEDs. In many embodiments, the elongate flexible light source comprises a rope light.

The elongate flexible light source may be configured to convert between a rope mode and a lantern mode, wherein in the lantern mode, the elongate flexible light source is configured to wrap around an exterior of the housing and in the rope mode, the elongate flexible light source is configured to unwrap and extend from the exterior of the housing. In some embodiments, the elongate flexible light source comprises a first end coupled to a magnetic end cap and a second end located opposite the first end and detachably coupled adjacent a base portion of the housing. When the convertible light device is in the rope mode, the first end of the elongate flexible light source may be configured to extend from the housing and may be coupled to an external anchor.

When the convertible light device is in the lantern mode, the elongate flexible light source may be configured to wrap around the exterior of the housing, such that there is at least a single layer of the elongate flexible light source wrapped around the exterior of the housing. In some embodiments, the magnetic end cap is configured to couple the first end of the elongate flexible light source to the housing adjacent a top portion of the housing. The magnetic end cap may comprise a hole configured to receive an attaching mechanism configured to couple the elongate flexible light source to the external anchor.

The battery pack may comprise a plurality of lithium-ion batteries. In some embodiments, the battery pack is configured to slideably couple to an interior portion of the housing, such that the battery pack is at least partially held within the housing. In many embodiments, the interior portion of the housing further comprises a storage compartment located above the battery pack.

The convertible light device may further comprise a lid removably coupled to a top portion of the housing, wherein the lid may be configured to provide access to the storage compartment. In some embodiments, the lid is configured to removably couple to an attaching mechanism, the attaching mechanism configured to couple the elongate flexible light source to an external anchor.

In some embodiments, the convertible light device further comprises a handle coupled to a top portion of the housing, the handle configured to rotate about 180 degrees. The housing may further comprise at least one charging port configured to enable charging of at least one of the battery pack and an external device. In some embodiments, the convertible light device further comprises a plurality of battery level indication lights and a battery indication button coupled to the housing. The battery indication button may be configured to illuminate at least one battery level indication light of the plurality of battery level indication lights.

In some embodiments, the convertible light device further comprises a brightness knob located on the housing, wherein the brightness knob is configured to control a brightness of the light emitted by the plurality of LEDs of the elongate flexible light source. The convertible light device may further comprise a power boost button located on the housing, and the power boost button may be configured to amplify a light output of the plurality of LEDs. In many embodiments, the convertible light device further comprises an LED located on a base of the housing, the LED configured to operate as a flashlight, wherein the LED is operatively coupled to a flashlight button located on the housing.

The convertible light device may further comprise a wrapping guide rail located on an exterior of the housing, the wrapping guide rail configured to guide the elongate flexible light source around an exterior of the housing. In some embodiments, the housing comprises a base portion comprised of a material configured to absorb impact. The elongate flexible light source may comprise a frosted material configured to diffuse the light emitted by the plurality of LEDs.

In some embodiments, the housing comprises a top portion, a base portion, and a middle portion, wherein the top portion and the base portion each define a first width and the middle portion defines a second width, wherein the second width is smaller than the first width.

The disclosure includes a convertible light device comprising a device housing, a battery pack comprising a battery pack housing, and an elongate flexible light source detachably coupled to the device housing and electrically coupled to the battery pack. In some embodiments, the battery pack is removably coupled to an interior portion of the device housing. The elongate flexible light source may comprise a plurality of LEDs.

In some embodiments, the convertible light device is configured to convert between a rope mode and a lantern mode. In the lantern mode, the elongate flexible light source may be configured to wrap around an exterior of the device housing. In the rope mode, the elongate flexible light source may be configured to unwrap and extend from the exterior of the device housing. In some embodiments, the elongate flexible light source comprises a rope light.

The convertible light device may further comprise a first plurality of magnets located on the device housing and a second plurality of magnets located along the elongate flexible light source. In some embodiments, the first plurality of magnets is configured to magnetically couple to the second plurality of magnets, thereby coupling the elongate flexible light source to the device housing. The second plurality of magnets may be configured to couple to an external magnetic surface. In some embodiments, the second plurality of magnets are evenly spaced along substantially an entire length of the elongate flexible light source.

The convertible light device may include a flashlight coupled to the battery pack housing. In some embodiments, the battery pack comprises an activation mechanism from the group consisting of a button, a switch, and combinations thereof. The activation mechanism may be coupled to the battery pack housing and operatively coupled to the flashlight. In some embodiments, the battery pack comprises a charging port coupled to the battery pack housing. The charging port may be configured to couple to a charging cable to charge the battery pack.

In some embodiments, the convertible light device comprises a control panel coupled to the device housing. The control panel may include a plurality of mode buttons configured to control an emission of light from the plurality of LEDs. In some embodiments, the plurality of mode buttons comprises a first mode button configured to select a first light mode, a second mode button configured to select a second light mode, a third mode button configured to select a third light mode, and a fourth light button configured to select a fourth light mode. The first light mode may define a party mode wherein the plurality of LEDs may be configured to emit light in sync with a music source. In some embodiments, the second light mode defines an emergency mode wherein the plurality of LEDs are configured to emit light in an "SOS" Morse Code signal. The third light mode may define a red light mode wherein the plurality of LEDs may be configured to emit red light. In some embodiments, the fourth light mode defines a custom color mode wherein the plurality of LEDs are configured to emit light in a custom color selection.

The control panel may include a plurality of battery level indication lights and a battery indication button. In some embodiments, the battery indication button is configured to illuminate at least one battery level indication light of the plurality of battery level indication lights. The convertible light device may include a storage compartment located within an interior portion of the device housing. In some embodiments, the storage compartment is accessible via a lid removably coupled to a top portion of the device housing. The convertible light device may further comprise an automatic winding mechanism configured to wind the elongate flexible light source around the device housing.

The disclosure includes a convertible lighting system comprising a first convertible light device and a second convertible light device. In some embodiments, the first convertible light device includes a first device housing, a first battery pack comprising a first battery pack housing, the first battery pack removably coupled to an interior portion of the first device housing, and a first elongate flexible light source detachably coupled to the first device housing and electrically coupled to the first battery pack, wherein the first elongate flexible light source comprises a first plurality of LEDs. The second convertible light device may include a second device housing, a second battery pack comprising a second battery pack housing, the second battery pack removably coupled to an interior portion of the second device housing, and a second elongate flexible light source detachably coupled to the second device housing and electrically coupled to the second battery pack, wherein the second elongate flexible light source may comprise a second plurality of LEDs. In some embodiments, the first convertible light device is configured to electrically couple to the second convertible light device.

The first convertible light device and the second convertible light device may each be configured to convert between a rope mode and a lantern mode. In some embodiments, in the lantern mode, the first elongate flexible light source is configured to wrap around an exterior of the first device housing, and the second elongate flexible light source is configured to wrap around an exterior of the second device housing. In the rope mode, the first elongate flexible light source may be configured to unwrap and extend from the exterior of the first device housing, and the second elongate flexible light source may be configured to unwrap and extend from the exterior of the second device housing. In some embodiments, the first elongate flexible light source comprises a first rope light and the second elongate flexible light source comprises a second rope light.

The second elongate flexible light source may be configured to detach from the second device housing and electrically couple to the first elongate flexible light source. In some embodiments, the first elongate flexible light source defines a first length and the second elongate flexible light source defines a second length that is different than the first length.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1A:
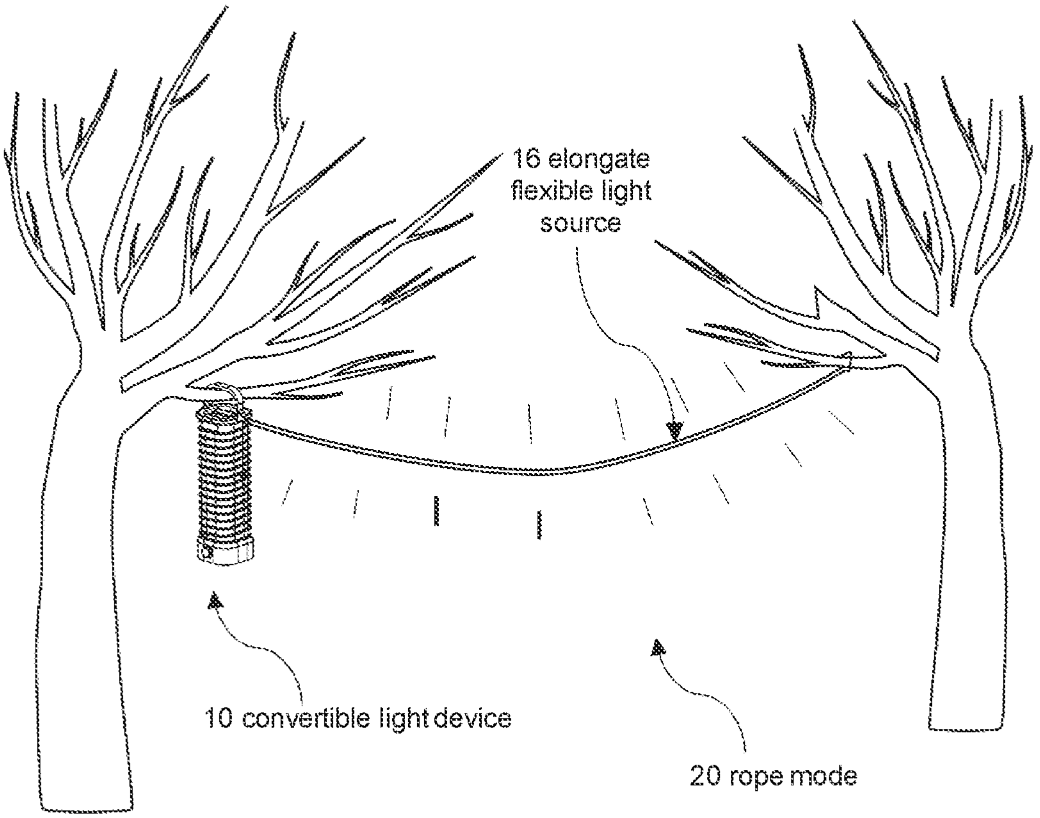
FIGS. 1A and 1B illustrate perspective views of a convertible light device, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

REFERENCE NUMERALS

10—convertible light device
12—housing
14—battery pack
16—elongate flexible light source
18—plurality of LEDs
20—rope mode
22—lantern mode
24—exterior (of housing)
26—first end (of elongate flexible light source)
28—second end (of elongate flexible light source)
30—magnetic end cap
32—attaching mechanism
34—plurality of lithium-ion batteries
36—hole (in magnetic end cap)
38—storage compartment
40—lid
42—locking knob
44—handle
46—battery indication button
48—top portion (of housing)
50—base portion (of housing)
52—middle portion (of housing)
54—at least one charging port
56—power boost button
58—brightness knob
60—at least one battery level indication light
62—first width
64—second width
66—flashlight button
68—flashlight
70—frosted material
72—wrapping guide rail
74—elongate flexible light source port
76—elongate flexible light source connector
78—magnet
80—metal plate
100—convertible light device
102—device housing
104—battery pack
106—elongate flexible light source
108—handle
110—battery pack housing
112—interior portion (of device housing)
114—charging port
116—flashlight
118—activation mechanism
120—connector
122*a*—first plurality of magnets
122*b*—second plurality of magnets
124—attaching mechanism
126—control panel
128—plurality of mode buttons
130*a*—first input button
130*b*—second input button
132—mobile device
134—plurality of mode buttons
200—convertible light device
202—device housing

Figure 1B:
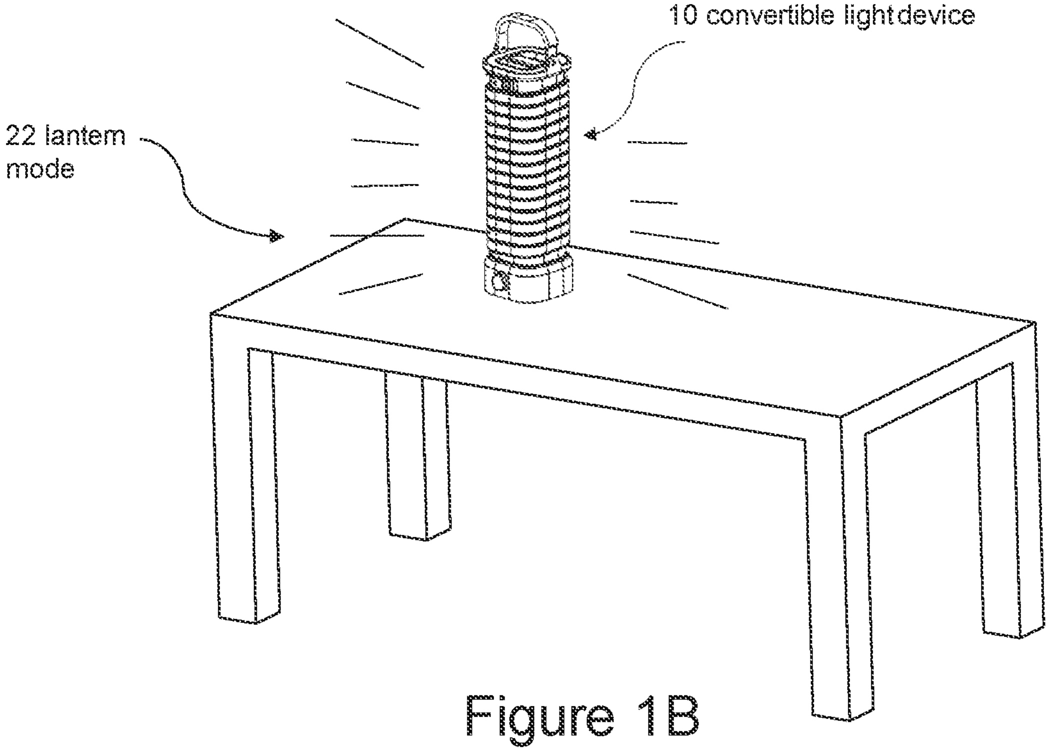

204—battery pack
206—elongate flexible light source
210—battery pack housing
212—interior portion (of device housing)
300—convertible lighting system FIG. 1A illustrates the convertible light device 10 in a rope mode 20 and FIG. 1B illustrates the convertible light device 10 in a lantern mode 22. In some embodiments, the convertible light device 10 includes an elongate flexible light source 16 that is configured to coil around the housing of the convertible light device 10. In the rope mode 20, the elongate flexible light source 16 may be configured to uncoil from the housing and extend from the housing to an external anchor point, as shown in FIG. 1A. Examples of external anchor points include, but are not limited to, a tree, a tent, a vehicle, a fence, a building, a boom on a boat, and the like. Accordingly, the convertible light device 10 may be particularly useful, in both the rope mode 20 and lantern mode 22, in a variety of circumstances, including: camping (e.g., inside a tent and/or to provide light to larger campsite area for cooking/food prep, playing games, reading, socializing, etc.), boating (e.g., yachting, cabin of a sailboat, etc.), RV use/"glamping" (e.g., use inside or outside vehicle, similar to camping), road trips, picnics, trade shows, backyards, and photography (e.g., indoor studio or off-site photoshoot). In addition, the convertible light device 10 may provide significant safety benefits, for example to illuminate a bicycle/bicyclist, pedicab/pedicab driver, and emergency lighting for individual users/families during a power outage, in addition to law enforcement and/or search and rescue for nighttime operations. It should be noted that the recited uses are included as examples and intended to be non-limiting.

In the lantern mode 22, the elongate flexible light source 16 may be configured to coil around the housing 12 of the light device 10 such that the light device 10 emits light from a concentrated area, as illustrated by FIG. 1B. In many embodiments, the elongate flexible light source 16 comprises a plurality of light sources, such as a plurality of LEDs 18 (shown in FIG. 9), that extend substantially the entire length of the elongate flexible light source 16. The elongate flexible light source 16 may be detachably coupled to the housing 12 and electrically coupled to a battery pack 14, which will be discussed in greater detail with reference to FIG. 9. More details of the elongate flexible light source 16 will be discussed later in the disclosure.

Figure 2:
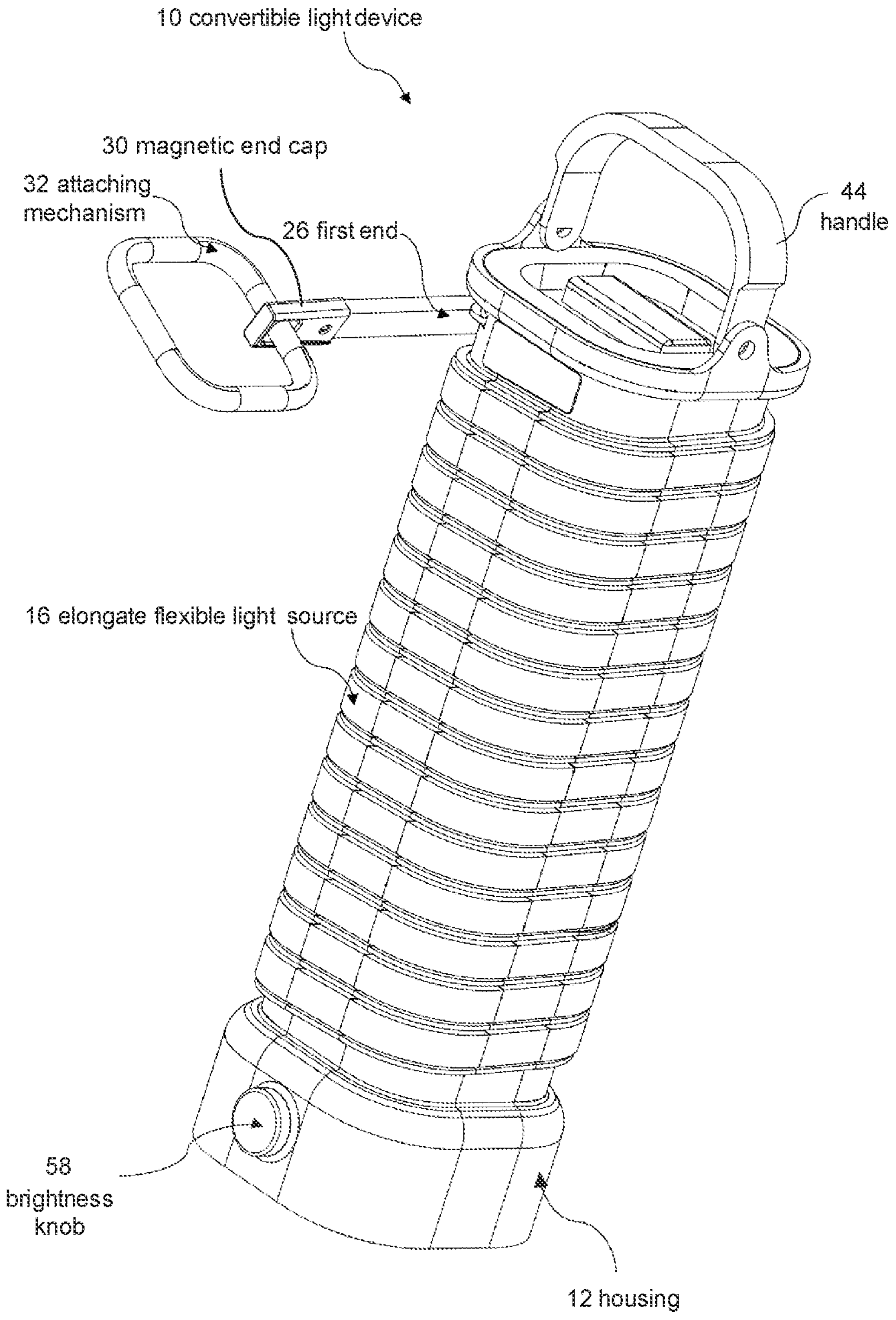
FIG. 2 illustrates a perspective view of a convertible light device, according to some embodiments.

FIG. 2 shows a front perspective view of the convertible light device 10. As illustrated, in some embodiments, the light device 10 includes a housing 12, an elongate flexible light source 16, a handle 44, and an attaching mechanism 32. The first end 26 of the elongate flexible light source 16 may be coupled to a magnetic end cap 30, as illustrated in FIG. 2. In many embodiments, the magnetic end cap 30 includes a hole 36 (shown in FIG. 4) configured to receive the attaching mechanism 32. The attaching mechanism 32 may thereby be configured to couple the first end 26 of the elongate flexible light source 16 to an external anchor when the convertible light device 10 is in the rope mode 20. When the convertible light device 10 is in the lantern mode 22, a magnet 78 of the magnetic end cap 30 may be configured to couple to a metal plate 80 located on the housing 12, as indicated in FIG. 3, thereby coupling the elongate flexible light source 16 to the housing 12.

FIG. 2 also includes a brightness knob 58 coupled to the housing 12. The brightness knob 58 may be located adjacent an end of the housing 12 opposite the handle 44, as shown in FIG. 2. In many embodiments, the brightness knob 58 is configured to control a brightness of the light emitted by the plurality of LEDs 18 of the elongate flexible light source 16. The brightness knob 58 may comprise a knob, switch, button (i.e., digital control), slider, or the like. In some embodiments, the brightness knob 58 serves as a power on/off feature, where turning the brightness knob 58 to at least a minimum level comprises turning on the convertible light device 10. The brightness knob 58 may include any number of brightness settings, ranging from very dim light emission to full light emission. In some embodiments, the brightness knob 58 is configured to provide finely-tuned control over a large range of brightness levels, such that a user is able to adjust the brightness to a precise level. The brightness knob 58 may comprise a number of pre-set levels rather than precise control. In some embodiments, the brightness knob 58 is configured to facilitate a "ramp up" sequence of illuminating the elongate flexible light source 16, such that a portion of the elongate flexible light source 16 turns on prior to another portion of the elongate flexible light source 16.

Figure 3:
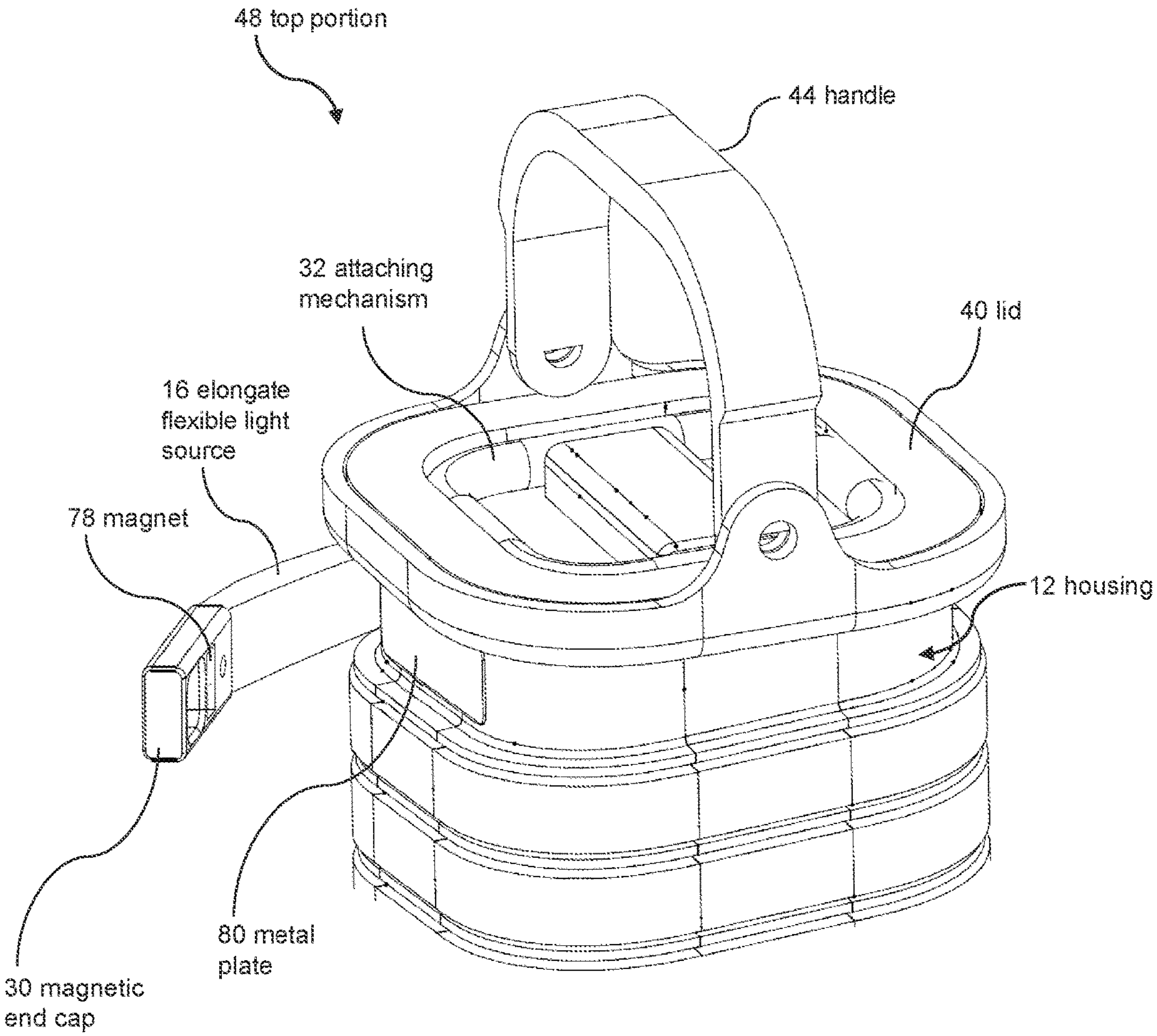
FIG. 3 illustrates a perspective view of a top portion of a convertible light device, according to some embodiments.

FIG. 3 shows a perspective view of a top portion 48 of the housing 12. As previously mentioned, the convertible light device 10 may include a metal plate 80 located on the housing 12 and a magnet 78 located on the magnetic end cap 30 of the elongate flexible light source 16, wherein the magnet 78 is configured to couple to the metal plate 80, thereby coupling the elongate flexible light source 16 to the housing 12 in the lantern mode 22. The housing 12 may include a plurality of metal plates 80. In some embodiments, the housing 12 comprises a metal material configured to couple to the magnetic end cap 30. The magnetic end cap 30 may comprise a non-magnetic end cap, and may be configured to couple to the housing 12 via a friction fit, hook-and-loop fastener, or any other suitable means.

Also illustrated in FIG. 3 are the handle 44, lid 40, and attaching mechanism 32. In many embodiments, the lid 40 is configured to receive the attaching mechanism 32 when the convertible light device 10 is in lantern mode 22 and the attaching mechanism 32 is not coupled to the magnetic end cap 30. The removable coupling between the attaching mechanism 32 and the lid 40 will be discussed further with reference to FIGS. 10A and 10B. In many embodiments, the handle 44 is configured to rotate about 180 degrees. Stated another way, the handle 44 may be configured to pivot or "flip" such that it is able to rest on top of either side of the lid 40. The handle 44 may be configured to "lock" or remain in an upright position. In some embodiments, the handle 44 is comprised of a rigid, inflexible material, such as metal or hard plastic. The handle 44 may be comprised of a soft, flexible material, such as rubber, leather, or another fabric. In some embodiments, the handle 44 is removably coupled to the convertible light device 10 such that a user may "switch out" different types of handle 44, depending on desired utility or aesthetic.

In some embodiments, the handle 44 is configured to open in a manner similar to a carabiner to enable the handle 44 to hook onto an external anchor so that the housing 12 of the convertible light device 10 can be suspended, such as from a tree, as illustrated in FIG. 1A. The handle 44 may also be configured to at least partially detach from the housing 12 to facilitate coupling the light device 10 to an external anchor. In some embodiments, the handle 44 is not configured to open or partially detach, and instead the external anchor is threaded through the opening between the handle 44 and the housing 12. The handle 44 may comprise any suitable type of clip, clasp, tie, hook, loop, magnet, and the like.

Figure 4:
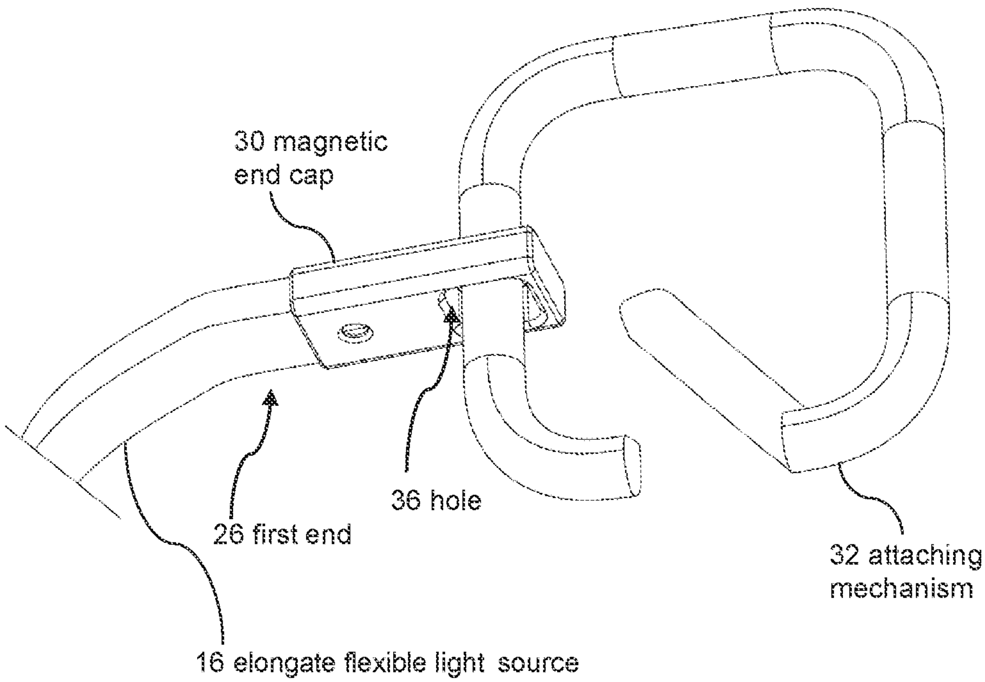
FIG. 4 illustrates a perspective view of a first end of an elongate flexible light source coupled to an attachment mechanism, according to some embodiments.

FIG. 4 shows an enlarged view of the attaching mechanism 32 coupled to the first end 26 of the elongate flexible light source 16 via the hole 36 in the magnetic end cap 30. As previously discussed, in many embodiments, the attaching mechanism 32 is configured to detachably couple to the magnetic end cap 30 and, when not coupled to the magnetic end cap 30, the attaching mechanism 32 is configured to couple to the lid 40. Though illustrated as a carabiner-style mechanism, similar to the handle 44, the attaching mechanism 32 may comprise any suitable type of attaching mechanism, including, but not limited to, other types of clips, clasps, ties, hooks, loops, magnets, and the like. In addition, the attaching mechanism 32 may comprise any suitable shape, including, but not limited to, rectangle, circle, triangle, oval, teardrop, diamond, trapezoid, and heart. In some embodiments, the attaching mechanism 32 defines a substantially similar shape as the lid 40. The attaching mechanism 32 may also define a size suitable to couple to the lid 40.

Rather than a magnetic end cap 30, the first end 26 of the elongate flexible light source 16 may comprise a clip or other type of mechanical connector similar to the attaching mechanism 32. In some embodiments, the first end 26 is fixedly coupled to a mechanical connector similar to the attaching mechanism 32. The first end 26 may comprise an electrical connector configured to couple to a second elongate flexible light source 16. Accordingly, in some embodiments, the convertible light device 10 comprises a plurality of elongate flexible light sources 16. Using a plurality of elongate flexible light sources 16 may allow a user to illuminate a larger area without requiring more than one housing 12 and battery pack 14. In some embodiments, the electrical connection between multiple elongate flexible light sources 16 allows a single brightness knob 58 to control the brightness of multiple elongate flexible light sources 16, either independently or as a group.

Figure 5:
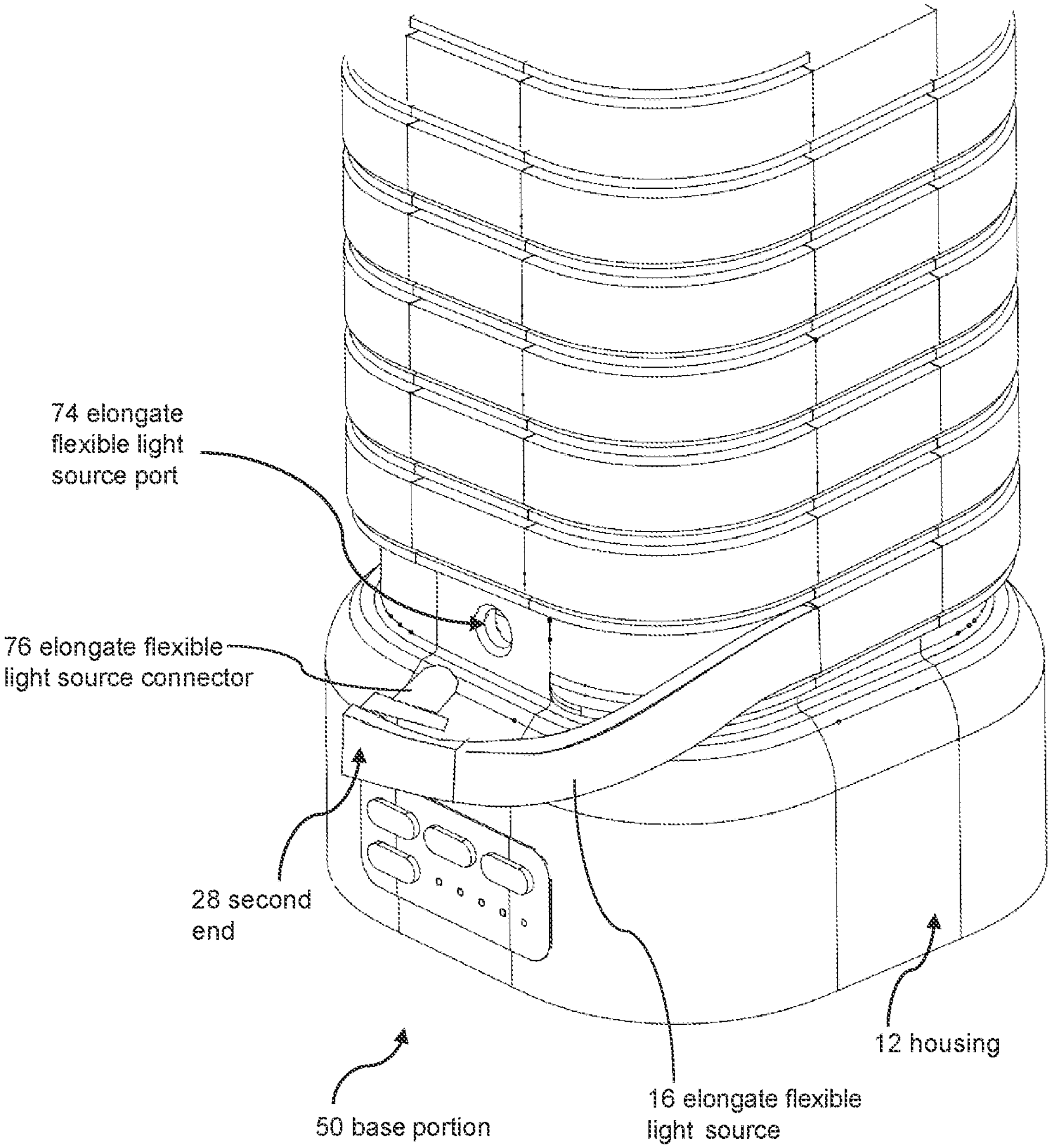
FIG. 5 illustrates a perspective view of a second end of an elongate flexible light source, according to some embodiments.

FIG. 5 illustrates a perspective view of a base portion 50 of the housing 12. It should be noted that the base portion 50 shown in FIG. 5 may be considered a "back" side of the housing 12, while the side of the housing 12 shown in FIG. 2 featuring the brightness knob 58 may be considered a "front" side. Of course, each user of the convertible light device 10 may consider any side "front" or "back" without any impact on the operation of the device 10.

As shown in FIG. 5, in some embodiments, the elongate flexible light source 16 comprises a second end 28 configured to detachably couple adjacent the base portion 50 of the housing 12. The second end 28 may comprise an elongate flexible light source connector 76, while the housing 12 may comprise an elongate flexible light source port 74 configured to receive the elongate flexible light source connector 76. In many embodiments, the elongate flexible light source connector 76 is configured to mechanically couple to the housing 12 and electrically couple to the battery pack 14, thus providing power to the elongate flexible light source 16. At least one of the elongate flexible light source port 74 and the elongate flexible light source connector 76 may be magnetic. In some embodiments, the elongate flexible light source connector 76 is configured to couple to the elongate flexible light source port 74 via a friction fit, similar to a typical electrical connection (e.g., charging cable and an electronic device, plug and an electrical socket, etc.). Alternatively, the second end 28 of the elongate flexible light source 16 may be configured to fixedly couple to the housing 12, and the convertible light device 10 may not include the elongate flexible light source connector 76 or the elongate flexible light source port 74 as shown in FIG. 5.

In some embodiments, the elongate flexible light source 16 is configured to illuminate even when detached from the elongate flexible light source port 74 of the housing 12. Accordingly, the elongate flexible light source 16 may be able to "hold" or maintain a charge and emit light even when disconnected from the battery pack 14 within the convertible light device 10. When detached, a user may be able to use the elongate flexible light source 16 in additional ways, such as wearing the elongate flexible light source 16, wrapping it around a bicycle or scooter, wrapping it around a pet (e.g., as a harness for a dog when walking at night or early in the morning), and/or any number of other ways.

In addition, the ability to detach the elongate flexible light source 16 from the housing 12 may increase the portability of the convertible light device 10. For example, a user may desire to use the flashlight 68 (shown in FIG. 6) located on the base portion 50 of the housing 12 to walk a distance away from the current location of the device 10. If the device 10 were in the rope mode 20, it would be a hassle to wind up the elongate flexible light source 16 prior to walking away with the device 10. Instead, the user may detach the elongate flexible light source 16 at the second end 28 and simply leave the elongate flexible light source 16 behind as the user walks away with the device 10 and uses the flashlight 68, such as to walk to a restroom, into a tent, etc. As such, the convertible light device 10 may be configured to provide light to two different locations simultaneously, as the elongate flexible light source 16 may continue emitting light while the user moves away with the flashlight 68 of the housing 12.

At least some portion of the second end 28 may not include the plurality of LEDs that make up the elongate flexible light source 16. As such, the second end 28 may comprise some distance of the elongate flexible light source 16 that comprises a plain cable without any LEDs. In some embodiments, the distance is a few inches.

Figure 6:
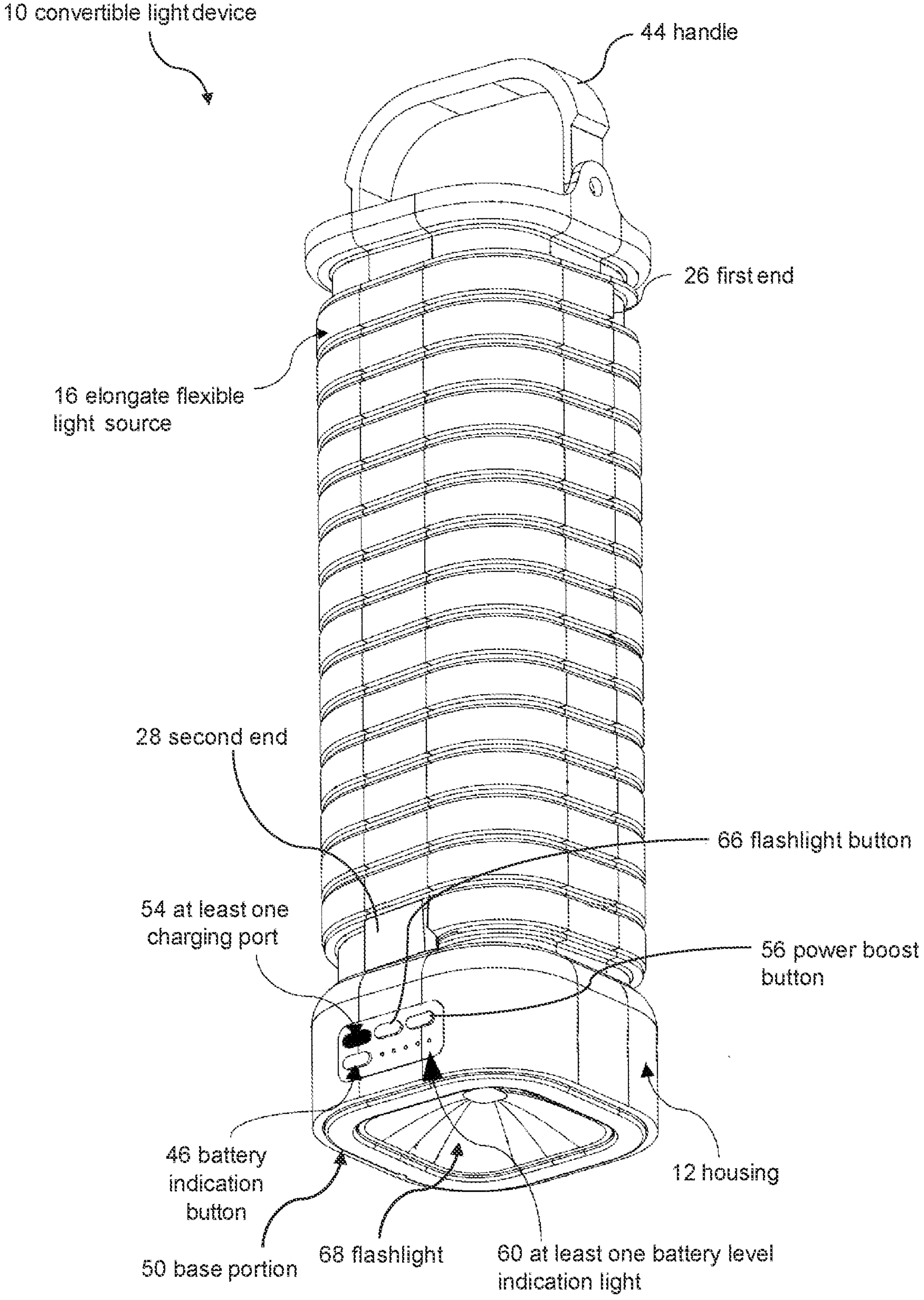
FIG. 6 illustrates a perspective view of a convertible light device, according to some embodiments.

Referring now to FIG. 6, another perspective view of the convertible light device 10 is illustrated, including a flashlight 68 located on the base portion 50 of the housing 12. The flashlight 68 will be discussed in greater detail later in the disclosure, in particular with reference to FIG. 11. Similar to FIG. 5, FIG. 6 may be considered to show a "back" side of the housing 12, opposite the "front" side including the brightness knob 58. As shown in FIG. 6, in some embodiments, the base portion 50 of the housing 12 includes a plurality of buttons located below the second end 28 of the elongate flexible light source 16. In addition to the plurality of buttons, the base portion 50 may include at least one charging port 54 and at least one battery level indication light 60. It should be noted that at least some of these components may be included on the top portion 48 of the housing 12, along with the handle 44.

In many embodiments, the at least one charging port 54 is configured to enable charging of at least one of the battery pack 14 (shown in FIG. 9) and at least one external device, such as a mobile phone, tablet, laptop, speaker, or the like. The at least one charging port 54 may be configured to provide "quick charging" to at least one of the battery pack 14 and the external device. In some embodiments, the at least one charging port 54 is configured to charge the battery pack 14 and/or at least one external device while the convertible light device 10 is in use (i.e., while at least one of the flashlight 68 and elongate flexible light source 16 are illuminated). Details of the battery pack, including the rechargeable nature of the batteries, will be discussed with reference to FIG. 9. The at least one charging port 54 may comprise a USB port, a USB-C port, a barrel-plug, or any other suitable connection type. It should be noted that each port of the at least one charging port 54 may comprise the same type of port connection, or may comprise different types of port connections. In some embodiments, one port is an input port, and one port is an output port. The at least one charging port 54 may comprise a single input/output port. The light device 10 may also be configured to charge wirelessly via a charging dock, rather than a charging port.

Among the plurality of buttons shown in FIG. 6 are a power boost button 56 and a flashlight button 66. In many embodiments, the flashlight button 66 is operatively coupled to the flashlight 68 located on the bottom of the housing 12, and is configured to power on/off the flashlight 68. It should be noted that any and/or all of the plurality of buttons (battery indication button 46, power boost button 56, flashlight button 66) may comprise dials or other selection mechanisms, rather than buttons. In addition, the plurality of buttons, the at least one charging port 54, and the at least one battery level indication light 60 may be arranged in a different layout than shown in the Figures.

In many embodiments, the power boost button 56 is configured to amplify a light output of the plurality of LEDs 18 of the elongate flexible light source 16. Stated another way, the power boost button 56 may serve as a way to increase the light output of the elongate flexible light source 16 without using the brightness knob 58. In some embodiments, the power boost button 56 is configured to enable a maximum emission of light to a level beyond what can be reached with the brightness knob 58. Rather than a power boost button 56, the brightness knob 58 may be configured to turn past a certain point (i.e., the highest "normal" level) to reach the same level of light emission achieved by the power boost button 56. The power boost button 56 may be configured to enable an increased level of light emission for an extended period of time. In some embodiments, the power boost button 56 is configured to enable an increased level of light emission for a shorter period of time (e.g., 5 minutes, 2 minutes, 90 seconds, 60 seconds, 30 seconds, 10 seconds, etc.) in order to preserve battery life. The power boost button 56 may be operatively coupled to at least one of the elongate flexible light source 16 and the flashlight 68.

Figure 7A:
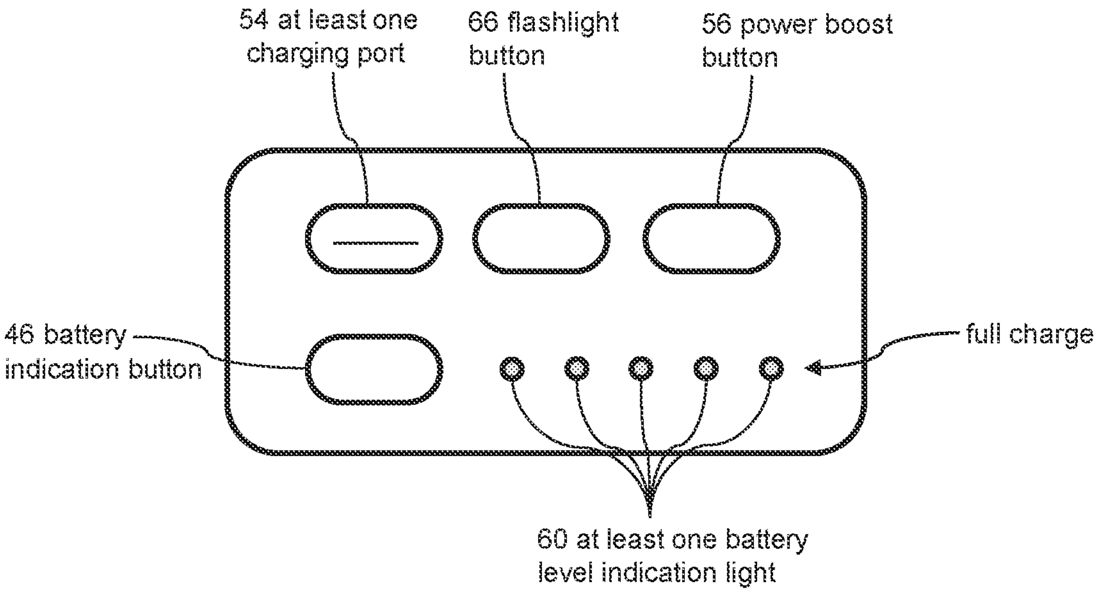
FIGS. 7A and 7B illustrate front views of a plurality of buttons of the convertible light device, according to some embodiments.

FIG. 6 also indicates that, in some embodiments, the convertible light device 10 includes a battery indication button 46 and at least one battery level indication light 60 coupled to at least one of the housing 12 and the battery pack 14. The battery indication button 46 and at least one battery level indication light 60 may be located on a top portion 48, base portion 50 (as shown), or anywhere else on the housing 12, either in the same or different locations. In many embodiments, when pressed, the battery indication button 46 is configured to illuminate the at least one battery level indication light 60 according to a power level of the battery pack 14. For example, as shown in FIG. 7A, a full charge of the battery pack 14 may be configured to illuminate all of the lights of the at least one battery level indication light 60. As indicated in FIG. 7B, a low charge of the battery pack 14 may be configured to illuminate fewer of the at least one battery level indication light 60, for example, two lights.

Figure 7B:
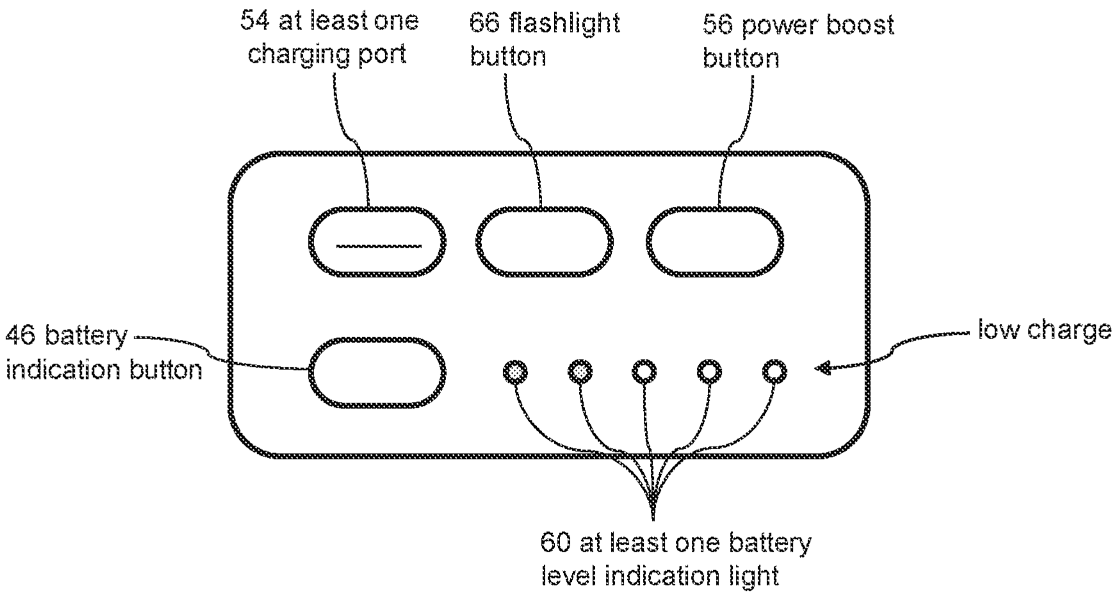

In some embodiments, as shown in FIGS. 7A and 7B, the at least one battery level indication light 60 comprises five lights. Each light may represent 20% of battery life, such that FIG. 7A indicates 100% battery life and FIG. 7B indicates 40% battery life. Of course, the at least one battery level indication light 60 may comprise any number of lights. In some embodiments, while the convertible light device 10 is charging, the at least one battery level indication light 60 is configured to illuminate to indicate progress of the charging cycle. The at least one battery level indication light 60 may illuminate continuously or non-continuously (i.e., "blinking"). In many embodiments, the at least one battery level indication light 60 comprises LED light(s). The at least one battery level indication light 60 may comprise another type of light. Rather than at least one battery level indication light 60, the convertible light device 10 may be configured to indicate battery life another way(s). For example, the elongate flexible light source 16 may be configured to illuminate in a distinct color and/or pattern to indicate battery level. In addition, a user may be able to see battery life on a mobile application communicatively coupled to the convertible light device 10.

Figure 8:
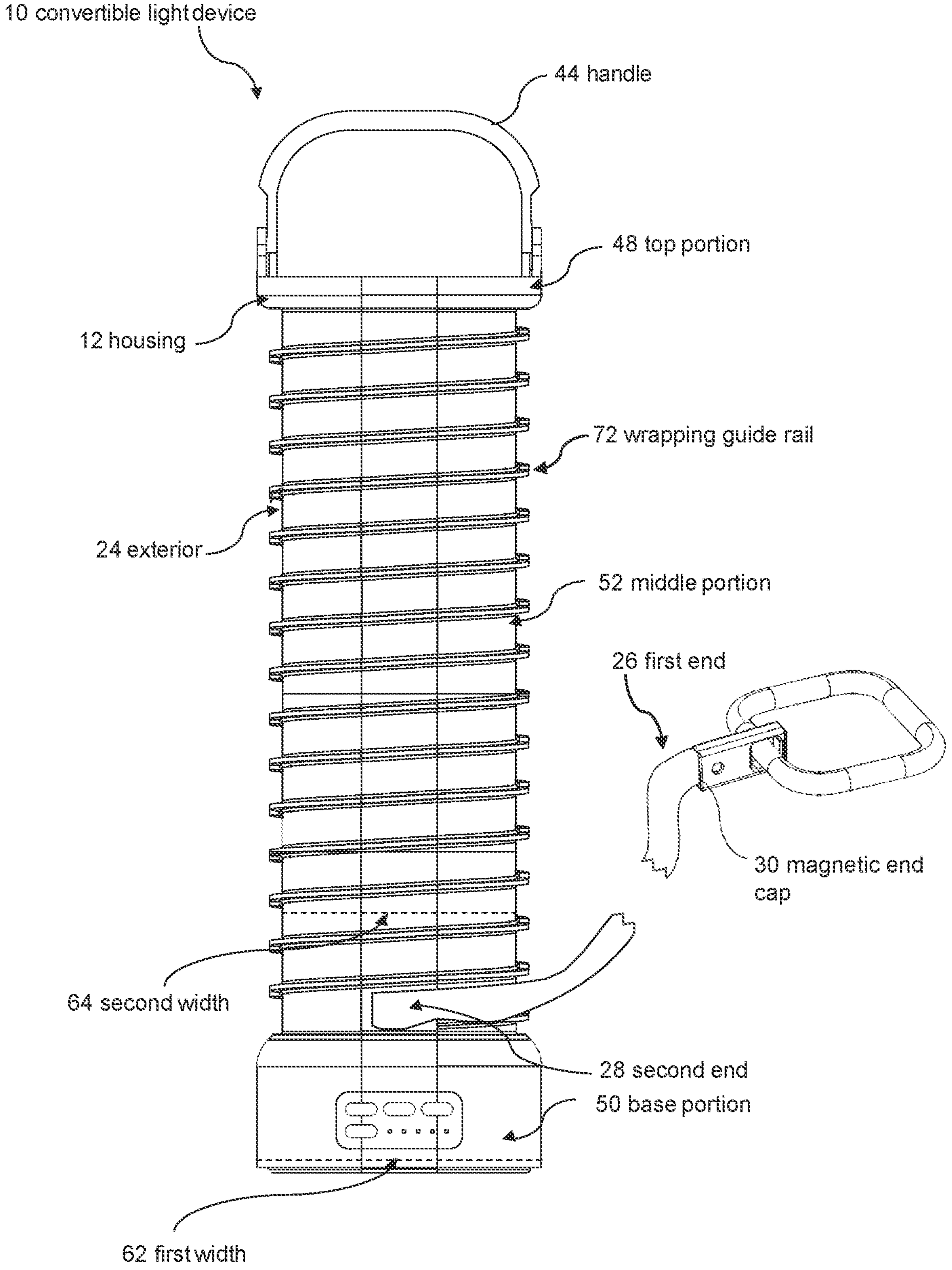
FIG. 8 illustrates a back view of a convertible light device, according to some embodiments.

FIG. 8 shows the convertible light device 10, including the top portion 48, middle portion 52, and base portion 50 of the housing 12. As previously discussed, in many embodiments the top portion 48 includes the handle 44 and the base portion 50 includes the brightness knob 58, at least one charging port 54, flashlight button 66, power boost button 56, battery indication button 46, and at least one battery level indication light 60, as shown in FIGS. 2 and 6. FIG. 8 also illustrates the middle portion 52, which, in many embodiments, is where the elongate flexible light source 16 winds around the housing 12. It should be noted that FIG. 8 is shown without much of the elongate flexible light source 16 in order to better illustrate the features of the housing 12, particularly the middle portion 52.

FIG. 8 demonstrates that, in some embodiments, the exterior 24 of the middle portion 52 of the housing 12 comprises a wrapping guide rail 72. The wrapping guide rail 72 may be configured to receive the elongate flexible light source 16, and may enable winding of the elongate flexible light source 16 in an even and orderly manner. In some embodiments, winding the elongate flexible light source 16 in an even manner facilitates substantially even distribution of the plurality of LEDs 18 when the convertible light device 10 is in the lantern mode 22. The wrapping guide rail 72 may be configured to receive at least a single layer of the elongate flexible light source 16, such that in the lantern mode 22 there may be at least a single layer of the elongate flexible light source 16 wrapped around the exterior 24 of the housing 12. In some embodiments, the wrapping guide rail 72 is configured to receive multiple layers of the elongate flexible light source 16. Some embodiments of the convertible light device 10 do not include the wrapping guide rail 72, and instead include a smooth, even surface extending the length of the middle portion 52 of the housing 12. The convertible light device 10 may include the ability to automatically wind the elongate flexible light source 16 around the housing 12, either with or without the wrapping guide rail 72. For example, in some embodiments, the light device 10 includes a winding mechanism configured to facilitate winding of the elongate flexible light source 16 around the exterior 24 of the housing 12. The winding mechanism may be operated mechanically or electrically, and may include any type of winding mechanism (e.g., crank, gear, and the like). The winding mechanism may be detachably or fixedly coupled anywhere on the light device 10.

FIG. 8 also illustrates the first width 62 of the base portion 50 and the second width 64 of the middle portion 52. It should be noted that, in many embodiments, the first width 62 also represents the width of the top portion 48. As shown in FIG. 8, the first width 62 may be larger than the second width 64. In some embodiments, the first width 62 is smaller than the second width 64. The first width 62 and second width 64 may also define substantially the same width. In many embodiments, when the elongate flexible light source 16 is wrapped around the middle portion 52, the width of the middle portion 52 is still less than the first width 62 of the base portion 50. When the elongate flexible light source 16 is wrapped around the middle portion 52, the width of the middle portion 52 may be substantially equal to the first width 62 of the base portion 50.

Figure 9:
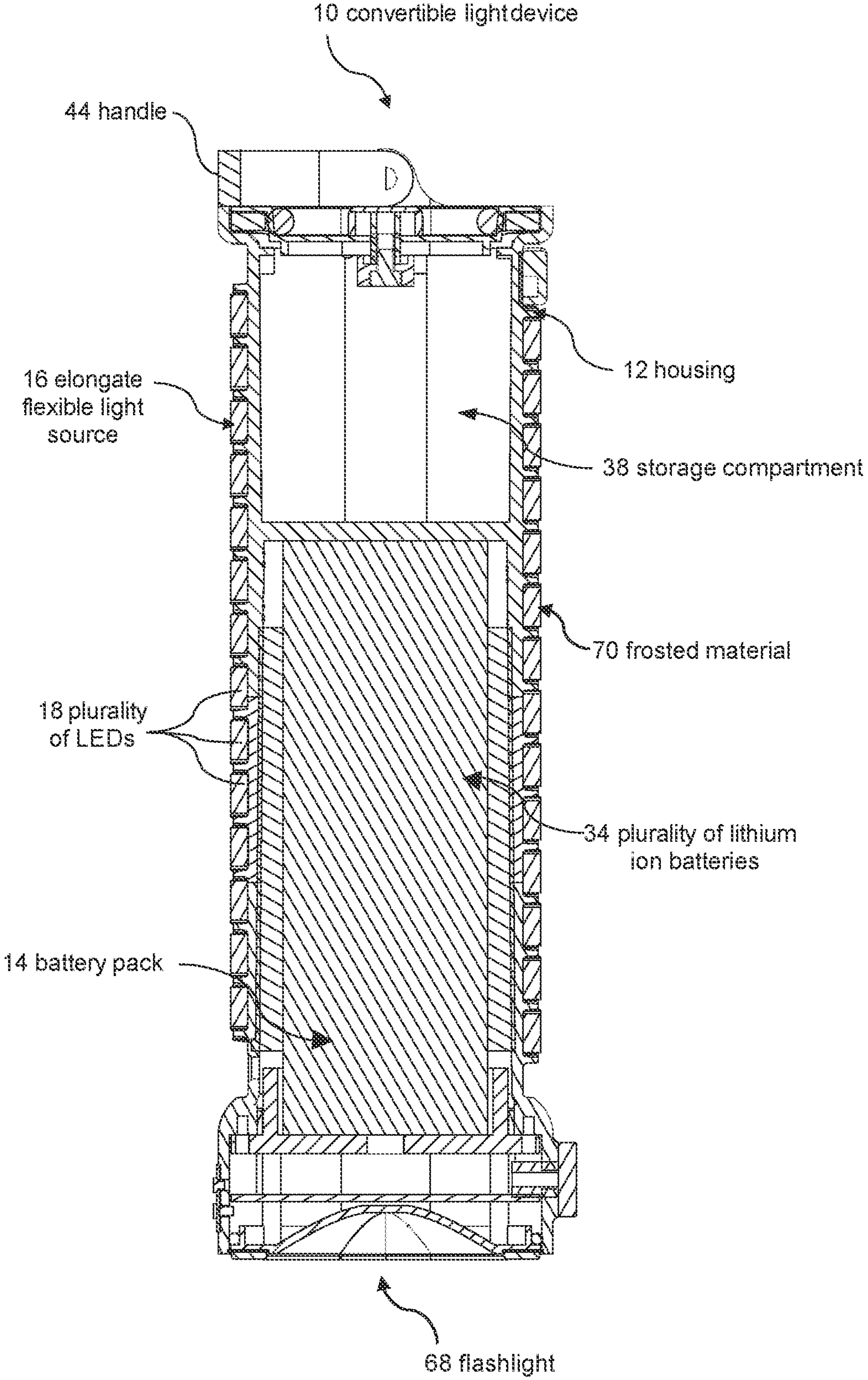
FIG. 9 illustrates a cross-section of a convertible light device, according to some embodiments.

FIG. 9 shows a cross-section view of the convertible light device 10. The cross-section includes the interior of the housing 12, which, in many embodiments, is configured to receive the battery pack 14. The housing 12 may be configured to slideably receive the battery pack 14, such that the battery pack 14 is at least partially held within the housing 12. The housing 12 may be configured to receive the battery pack 14 in any other suitable manner. In some embodiments, the battery pack 14 is fixedly coupled to the housing 12, and comprises a permanent battery pack 14. The battery pack 14 may be removably coupled to the housing 12. In many embodiments, as illustrated in FIG. 9, the battery pack 14 defines a height less than a height of the housing 12, such that there is space within the housing 12 above the battery pack 14. This space may define a storage compartment 38, as will be discussed further with reference to FIGS. 10A and 10B. The battery pack 14 may define a height and/or width greater or smaller than illustrated in FIG. 9.

In some embodiments, the battery pack 14 comprises a plurality of lithium-ion batteries 34. The plurality of lithium-ion batteries 34 may comprise six lithium-ion batteries. The plurality of lithium-ion batteries 34 may comprise any other number of batteries. In some embodiments, the battery pack 14 comprises a different type of battery than lithium-ion battery. The batteries in the battery pack 14 may comprise rechargeable batteries. The batteries in the battery pack 14 may comprise any suitable type of rechargeable batteries. As previously discussed, in many embodiments, the battery pack 14 is configured to charge via the at least one charging port 54. The battery pack 14 may be configured to charge via a solar panel, kinetic energy (e.g., a hand crank), or any number of other suitable methods.

In some embodiments, the batteries are configured to illuminate the elongate flexible light source 16 for a first amount of time on a full charge and at full brightness. The elongate flexible light source 16 may remain illuminated for longer than the first amount of time at a lower brightness level. The first amount of time may be a few hours. In some embodiments, the battery pack 14 comprises a plurality of battery packs. The battery pack 14 may also include a battery control board.

FIG. 9 also illustrates the plurality of LEDs 18 that make up the elongate flexible light source 16. The elongate flexible light source 16 may be thought of as a "rope light," and the plurality of LEDs 18 may be visible from either side of the "rope" (the elongate flexible light source 16). The plurality of LEDs 18 may be visible from only one side of the "rope." In some embodiments, the elongate flexible light source 16 comprises a frosted material 70 configured to diffuse the light emitted by the plurality of LEDs 18. The convertible light device 10 may include a sheath configured to fit over (e.g., similar to a sleeve) the elongate flexible light source 16, wherein the sheath may comprise a frosted material 70 to diffuse light. In some embodiments, the sheath comprises a hard cover configured to slideably receive the elongate flexible light source 16. The sheath may protect the elongate flexible light source 16 while also diffusing light emitted by the plurality of LEDs 18.

In some embodiments, the plurality of LEDs 18 extends substantially the entire length of the elongate flexible light source 16. The plurality of LEDs 18 may extend less than substantially the entire length of the elongate flexible light source 16. In some embodiments, the plurality of LEDs 18 comprises a light source other than LEDs. The plurality of LEDs 18 may comprise LEDs of different colors/configured to emit different colors (i.e., RGB LEDs). The convertible light device 10 may be configured to operate in different "modes," where each mode illuminates the plurality of LEDs in a different pattern, color, brightness, etc. For example, a "party mode" may include flashing/strobing the LEDs while a "normal mode" includes steady, even illumination of the LEDs. The brightness knob 58 may be configured to control and select the different modes of the elongate flexible light source 16. In some embodiments, the light device 10 includes at least one of Wi-Fi, Bluetooth, and cellular connectivity. This connectivity may be integrated into the different modes of the light device 10; for example, "party mode" may sync with music playing from a device connected (wirelessly or wired) to the light device 10 such that the LEDs 18 flash on beat with the music. As previously mentioned, the convertible light device 10 may be communicatively coupled to a mobile application on a computing device, such as a smartphone or tablet. The mobile application may enable a user to program different "modes" and control the mode selection.

FIG. 9 also shows that, in some embodiments, the convertible light device 10 defines a shape that is generally rectangular. A generally rectangular shape may prevent the light device 10 from rolling when placed on its side, such as on a table or ground surface. Instead, the convertible light device 10 may define a shape that is generally circular. The convertible light device 10 may define a shape that is generally triangular, generally ovoid, or any other suitable shape.

Figure 10A:
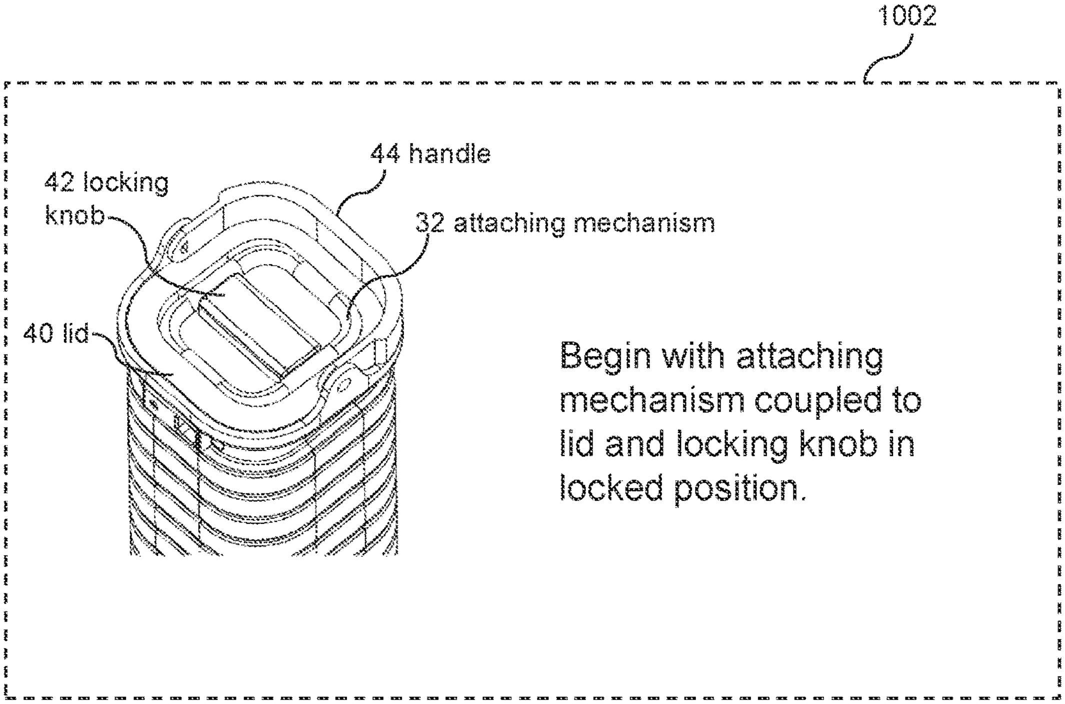
FIGS. 10A and 10B illustrate a method of removing a lid of a convertible light device, according to some embodiments.
Figure 10A:
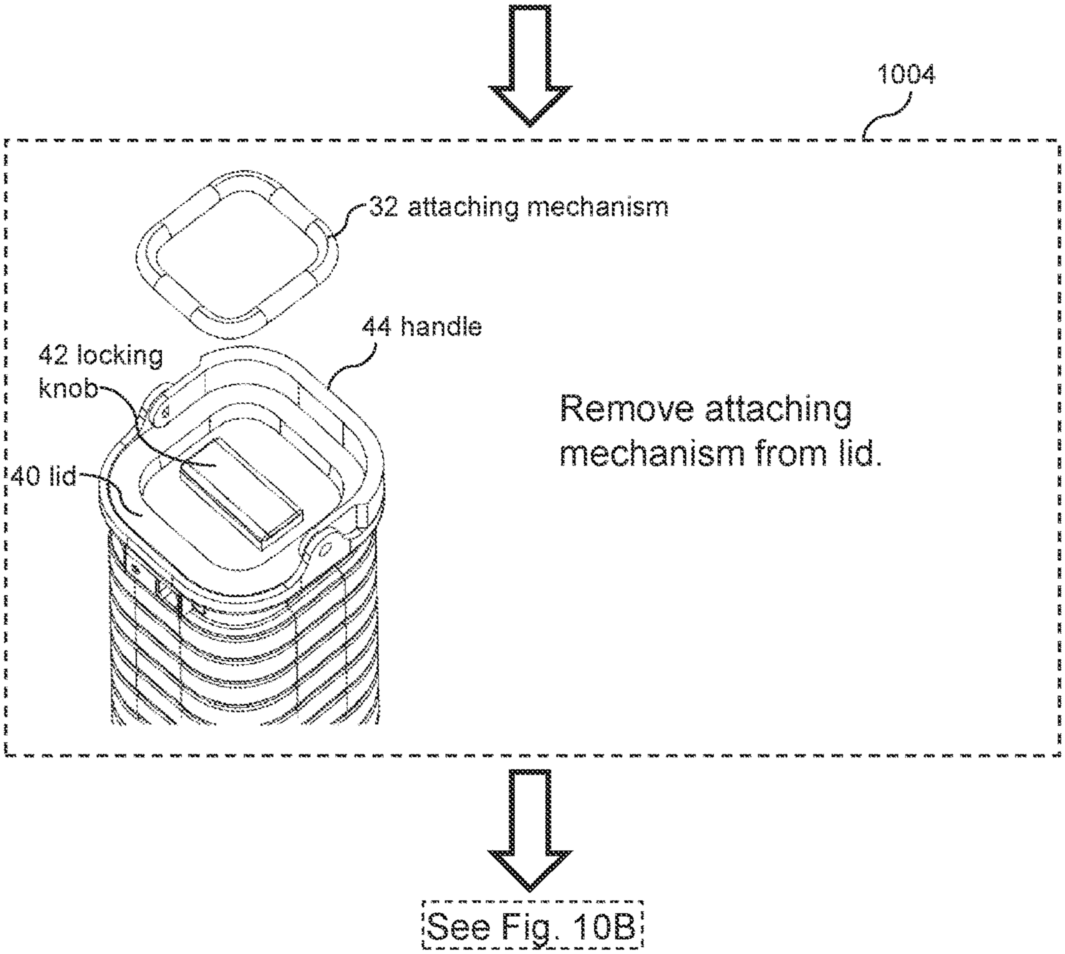
Figure 10B:
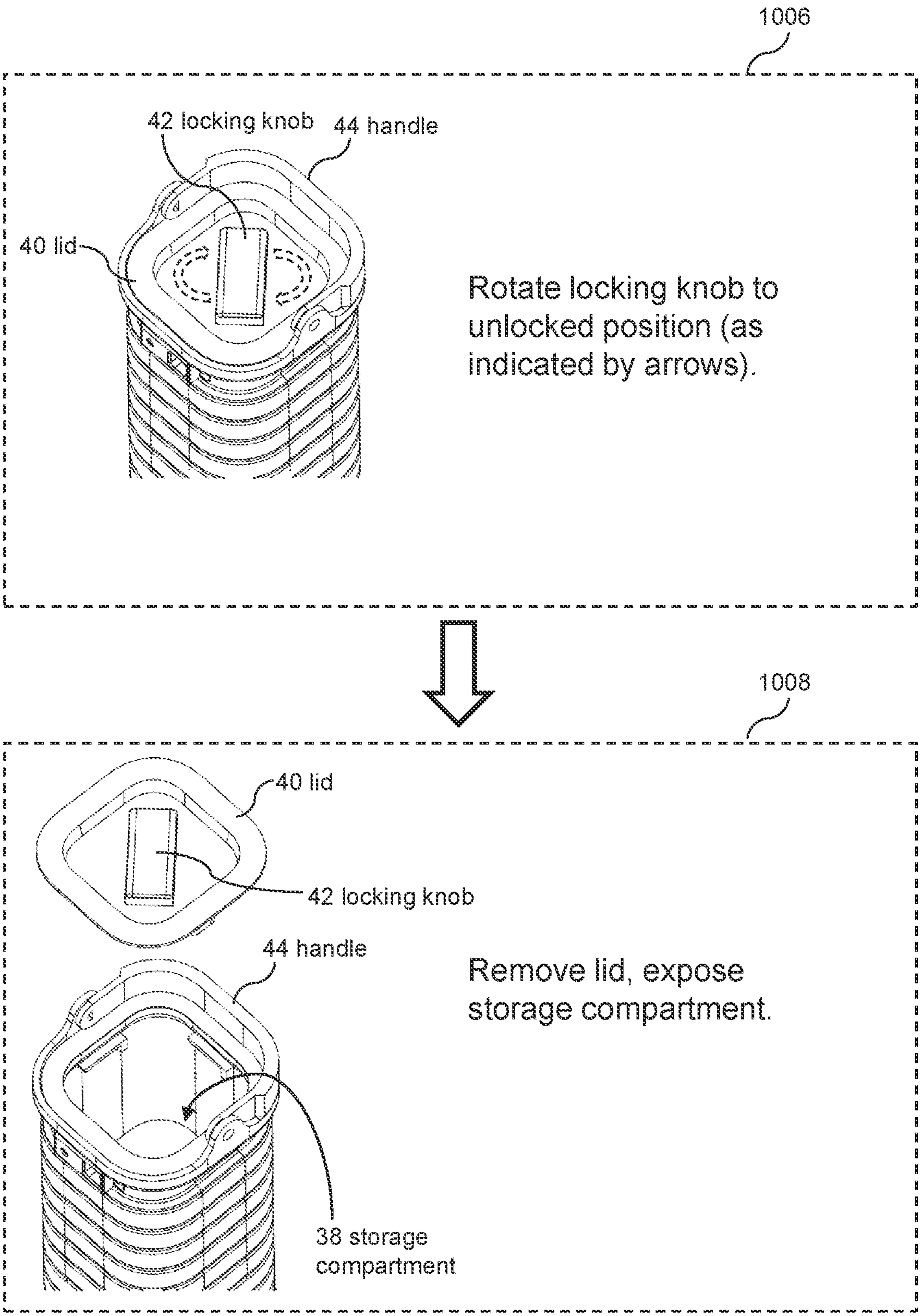

In many embodiments, the convertible light device 10 further comprises a lid 40 removably coupled to the top portion 48 of the housing 12. FIGS. 10A and 10B illustrate a method of removing the lid 40 to gain access to the storage compartment 38, shown in FIG. 9. In some embodiments, as shown in FIG. 10A, the lid 40 comprises a locking knob 42 configured to lock and unlock the lid 40. As mentioned with reference to FIG. 3, the attaching mechanism 32 may be configured to couple to the lid 40 when the attaching mechanism 32 is not coupled to the elongate flexible light source 16. The attaching mechanism 32 may be configured to detachably couple to the lid 40 via a friction fit, magnet(s), or any suitable coupling mechanism.

A method of removing the lid 40 begins with the attaching mechanism 32 coupled to the lid 40 and the locking knob 42 in the locked position, as indicated in step 1002 of FIG. 10A. From that point, a user may remove the attaching mechanism 32 from the lid 40 (at step 1004). As shown in FIG. 10B, the user may then turn the locking knob 42 to the unlocked position (at step 1006), and remove the lid 40 from the housing 12, thereby exposing the storage compartment 38 (at step 1008). In many embodiments, the storage compartment 38 is at least one of water resistant and waterproof. The storage compartment 38 may be sized to hold any number of items, including, but not limited to, key(s), a small wallet, loose cash and/or credit card(s), a multi-tool, jewelry, small food items, and the like. In some embodiments, the storage compartment 38 measures about 67 mm×67 mm×74 mm. The storage compartment 38 may be larger than the listed dimensions. In some embodiments, the storage compartment is smaller than the listed dimensions.

Figure 11:
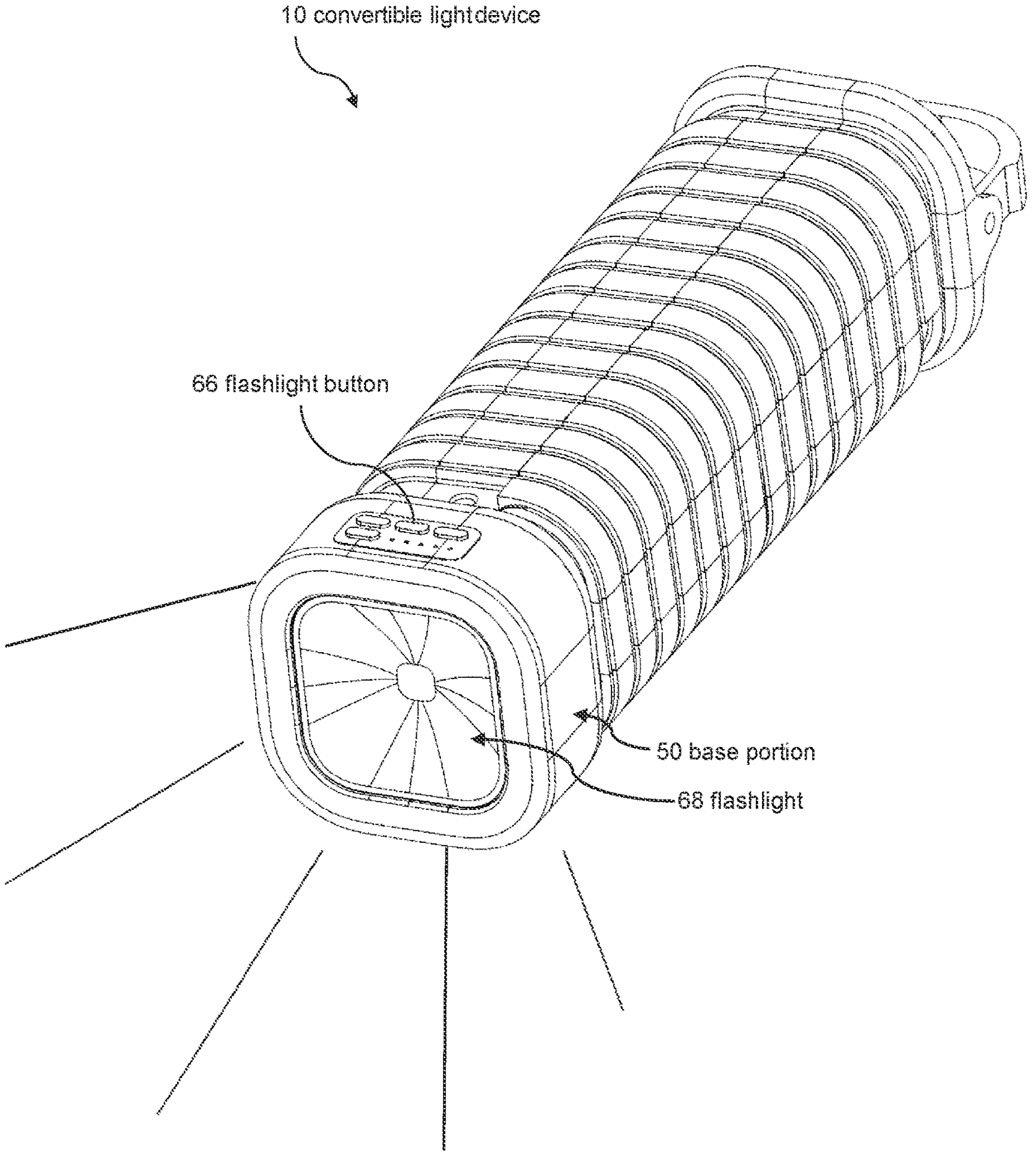
FIG. 11 illustrates a bottom perspective view of a convertible light device including a flashlight, according to some embodiments.

Turning now to FIG. 11, a bottom perspective view of the convertible light device 10 is shown, including the flashlight 68 coupled to the base portion 50 of the housing 12. As previously discussed, the flashlight 68 may be operatively coupled to the flashlight button 66. In some embodiments, the flashlight 68 is instead turned on/off by depressing the lens. The flashlight 68 may comprise a single LED configured to emit light in a singular "beam" or direction. The flashlight 68 may also be configured to emit light in all directions, and as such, "light up" at least the base portion 50 of the housing 12. The flashlight 68 may also "light up" more of the housing 12 than just the base portion 50. The flashlight 68 may comprise a single-color LED, an RGB LED, or any other suitable type of light source. Similar to the elongate flexible light source 16, the flashlight 68 may comprise a programmable light capable of emitting light in different "modes" comprising different colors, patterns, sequences, etc. The flashlight button 66 may be configured to select at least one mode of the flashlight 68. The flashlight 68 may be communicatively coupled to a mobile application configured to program and control light emission from the flashlight 68.

In some embodiments, the flashlight 68 is located within the base portion 50 of the housing 12. The flashlight 68 may be located at least partially within the base portion 50 of the housing 12. The flashlight 68 may be located on a base of the battery pack 14. In addition to and/or instead of the flashlight button 66, the flashlight 68 may be controlled via the brightness knob 58, and may also be operatively coupled to the power boost button 56. The convertible light device 10 may comprise more than one brightness knob 58, where one brightness knob 58 controls the elongate flexible light source 16 and one brightness knob 58 controls the flashlight 68. Similarly, the light device 10 may comprise more than one power boost button 56. The convertible light device 10 may be configured such that both the flashlight 68 and the elongate flexible light source 16 may be illuminated at the same time.

In some embodiments, the base portion 50 of the housing 12 comprises a protective material configured to absorb impact. For example, the base portion 50 may comprise a border, ring, pad, or the like comprised of silicone, rubber, or a similar material to prevent damage to the convertible light device 10 if the device 10 is dropped, knocked over, etc. Substantially an entire portion of the base portion 50 of the housing 12 may comprise the protective material. The protective material may be located on only certain areas of the base portion 50, such as around a perimeter of the flashlight 68 and on the corners. Other parts of the housing 12, in addition to or in place of the base portion 50, may comprise the protective material.

The light device 10 may also include a cover configured to fit over at least a portion of the housing 12. For example, in some embodiments, the cover is configured to fit over a middle portion 52 of the housing 12 such that the cover substantially encloses the elongate flexible light source 16 when the light device 10 is in the lantern mode 22. The cover may comprise a material, such as a frosted material, such that the cover diffuses the light emitted by the elongate flexible light source 16. The cover may be slideably coupled to the housing 12, and may be configured to slide toward the base of the housing 12. In some embodiments, the cover serves as a stand for the light device 10 when the cover slides toward the base of the housing 12. The cover may be configured to act as the winding mechanism, and thereby may be configured to facilitate coiling the elongate flexible light source 16 around the housing 12. The cover may be detachably coupled to the light device 10. In some embodiments, the cover is fixedly coupled to the housing 12.

The different elements of the light device 10 may comprise any number of suitable materials and/or combinations of materials. For example, the housing 12 may comprise polymer plastic (e.g., ABS plastic), metallic, rubber, or a combination of materials. The handle 44 and attaching mechanism 32 may also comprise metallic, plastic, or combination materials. The elongate flexible light source 16 may comprise the plurality of LEDs 18 inside flexible plastic tubing. In some embodiments, the plastic tubing is clear. The plastic tubing may comprise a frosted material 70 to provide light diffusion. As previously mentioned, the cover may also comprise a frosted material, such as plastic, to provide light diffusion. In some embodiments, the LEDs of the plurality of LEDs 18 emit light at about 1000 W. Any of the materials used to comprise any of the elements of the light device 10 may comprise substantially waterproof materials. The materials may also be substantially "tough" and resistant to breaking, wear-and-tear, etc., even after being dropped, knocked over, and the like.

In some embodiments, the convertible light device 10 comprises a single battery pack 14 and a single "rope" of the elongate flexible light source 16. The rope may measure about 10 feet in length. In some embodiments, the rope measures more than 10 feet in length. The rope may also be fewer than ten feet in length. Another embodiment of the convertible light device 10 may comprise two battery packs 14 and the elongate flexible light source 16 may comprise two or more ropes. The flexible light source 16 may comprise a single rope, but the single rope may be longer than the single rope of the single battery pack 14 embodiments. A light device 10 including two battery packs 14 may comprise a housing 12 that is at least one of wider and longer than the housing 12 of a light device 10 including a single battery pack 14.

In addition to the attaching mechanism 32 and handle 44, the convertible light device 10 may be configured for additional mounting and/or hanging options. For example, a base portion 50 of the housing 12 may comprise a magnetic material in order to enable the housing 12 to magnetically couple to a metal surface (e.g., to the side of a camper, RV, passenger vehicle, etc.). The convertible light device 10 may also be configured to couple to a stand when hanging the device 10 is not possible. For example, the device 10 may comprise a connector and/or mount suitable for coupling to a tri-pod typically used for a camera. The convertible light device 10 may be configured to couple to a more portable and/or wearable type of mount, similar to a camera accessory commonly used to record a user or the user's point of view during physical activity (e.g., mountain biking, skiing, snowboarding, surfing, running, etc.).

Figure 12:
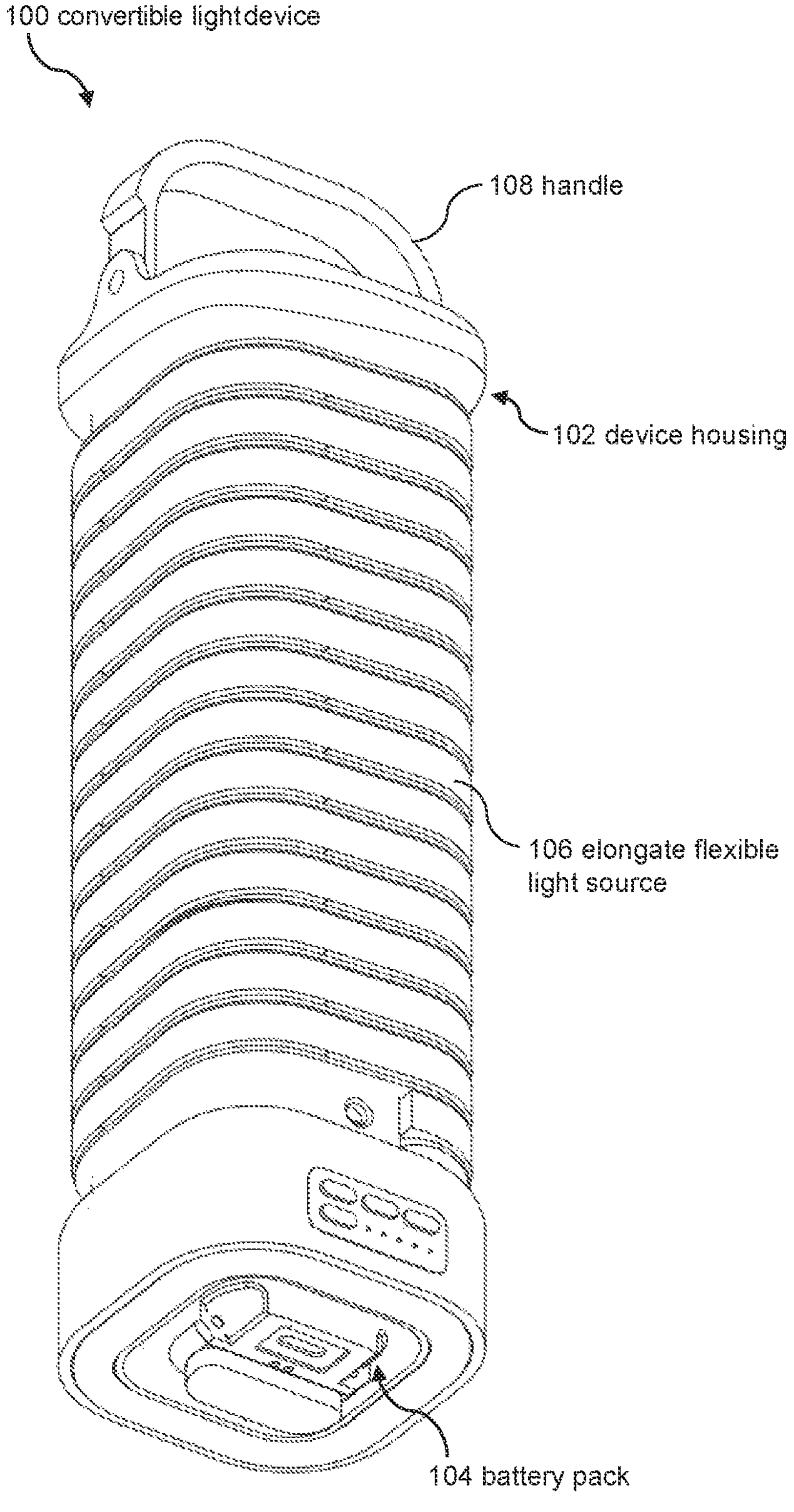
FIG. 12 illustrates a perspective view of a convertible light device, according to some embodiments.

FIG. 12 illustrates a perspective view of a convertible light device 100. The convertible light device 100 may be similar to the convertible light device 10 previously discussed in this disclosure. For example, in some embodiments, the convertible light device 100 includes a device housing 102 with a handle 108, an elongate flexible light source 106, and a battery pack 104. The handle 108 may be substantially the same as the handle 44 previously discussed in this disclosure. In some embodiments, the device housing 102, the battery pack 104, and the elongate flexible light source 106 of the convertible light device 100 differ from the corresponding components of the convertible light device 10. Each of these components will be discussed in greater detail with reference to FIGS. 13-17.

Similar to the convertible light device 10 and FIGS. 1A and 1B, the convertible light device 100 may be configured to convert between a rope mode and a lantern mode. In some embodiments, in the lantern mode, the elongate flexible light source 106 is configured to wrap around an exterior portion of the device housing 102. In the rope mode, the elongate flexible light source 106 may be configured to unwrap and extend from the exterior of the device housing 102. In some embodiments, the elongate flexible light source 106 comprises a rope light.

Though not specifically shown in FIGS. 12-17 depicting the convertible light device 100, it should be noted that the ends of the elongate flexible light source 106 may be substantially similar to the ends of the elongate flexible light source 16 of the convertible light device 10. For example, the elongate flexible light source 106 may comprise a first end with a magnetic end cap configured to couple to the device housing 102, as illustrated in FIG. 2. The magnetic end cap may also comprise a hole configured to receive an attaching mechanism, as shown in FIG. 4. In some embodiments, a second end of the elongate flexible light source 106 is configured to detachably couple to an elongate flexible light source port in the device housing 102, as demonstrated in FIG. 5. Similar to the elongate flexible light source 16, the elongate flexible light source 106 may comprise a plurality of LEDs.

Figure 13A:
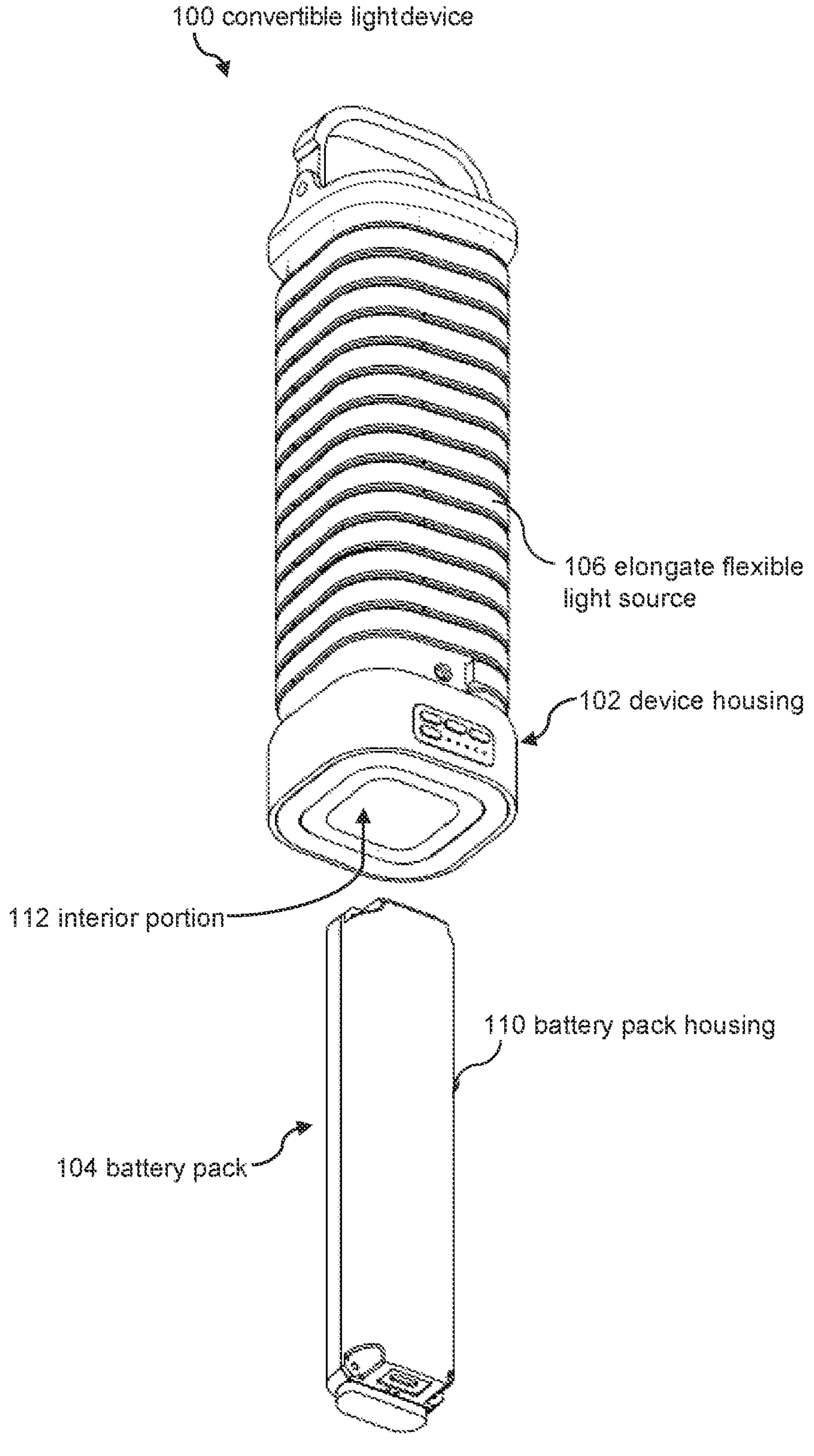
FIG. 13A illustrates a perspective view of a convertible light device with a battery pack removed, according to some embodiments.
Figure 13B:
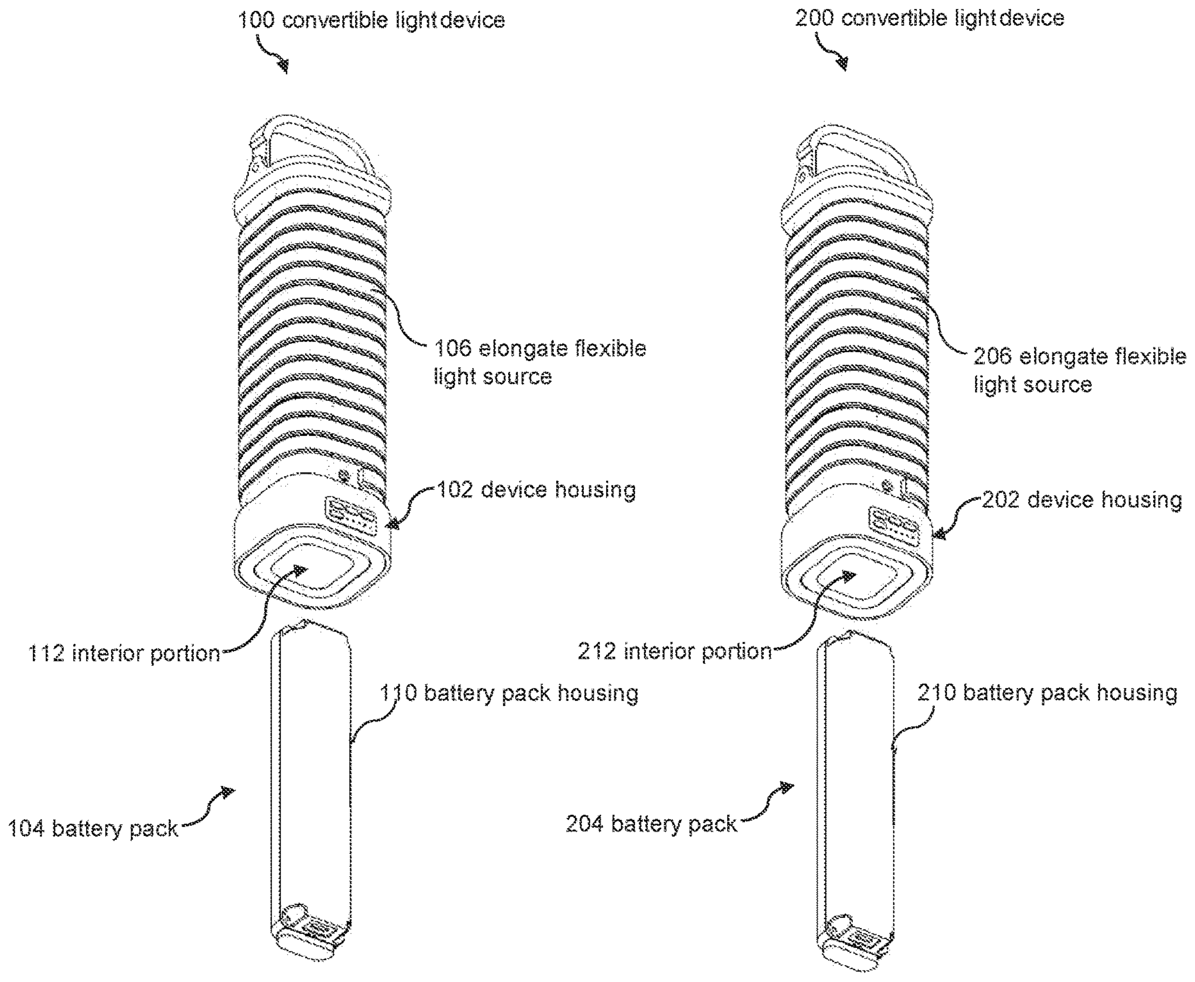
FIG. 13B illustrates a perspective view of two convertible light devices with battery packs removed, according to some embodiments.

In some embodiments, as illustrated in FIGS. 13A and 13B, the battery pack 104 is configured to removably couple to an interior portion 112 of the device housing 102. The battery pack 104 may comprise a battery pack housing 110 configured to house at least one rechargeable battery. Similar to the battery pack 14 of the convertible light device 10, the battery pack 104 may comprise a plurality of lithium-ion batteries. The battery pack 104 may comprise a single lithium-ion battery. The battery pack 104 may comprise any suitable type of rechargeable battery. Additionally, FIG. 13B shows a first light convertible light device 100 and a second convertible light device 200 that also includes a battery pack 204, with a battery pack housing 210, configured to removably couple to an interior portion 212 of a device housing 202. The second convertible light device 200 may be substantially similar to the first convertible light device 100.

Figure 14A:
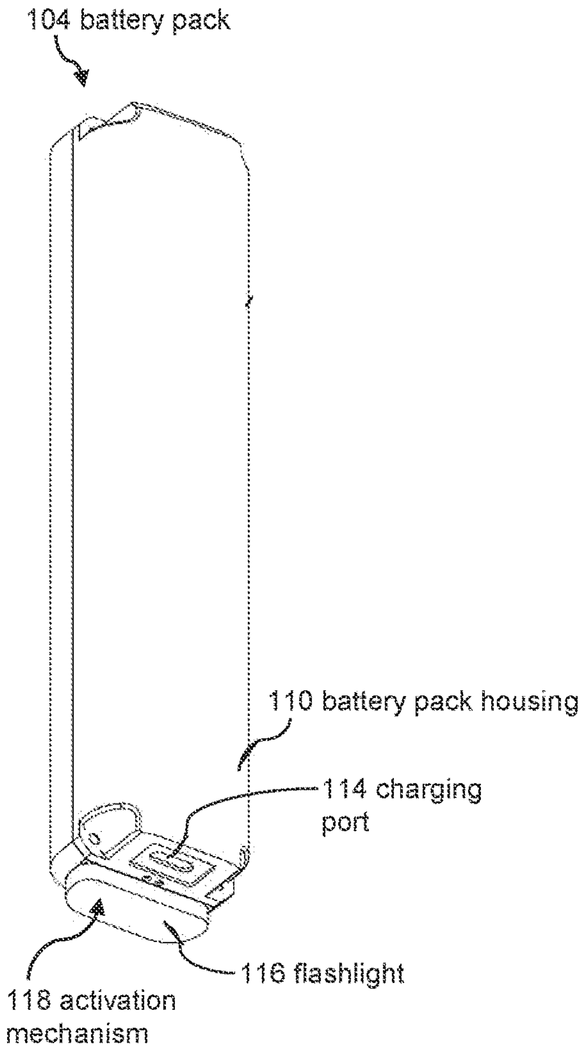
FIGS. 14A and 14B illustrate perspective views of a battery pack, according to some embodiments.
Figure 14B:
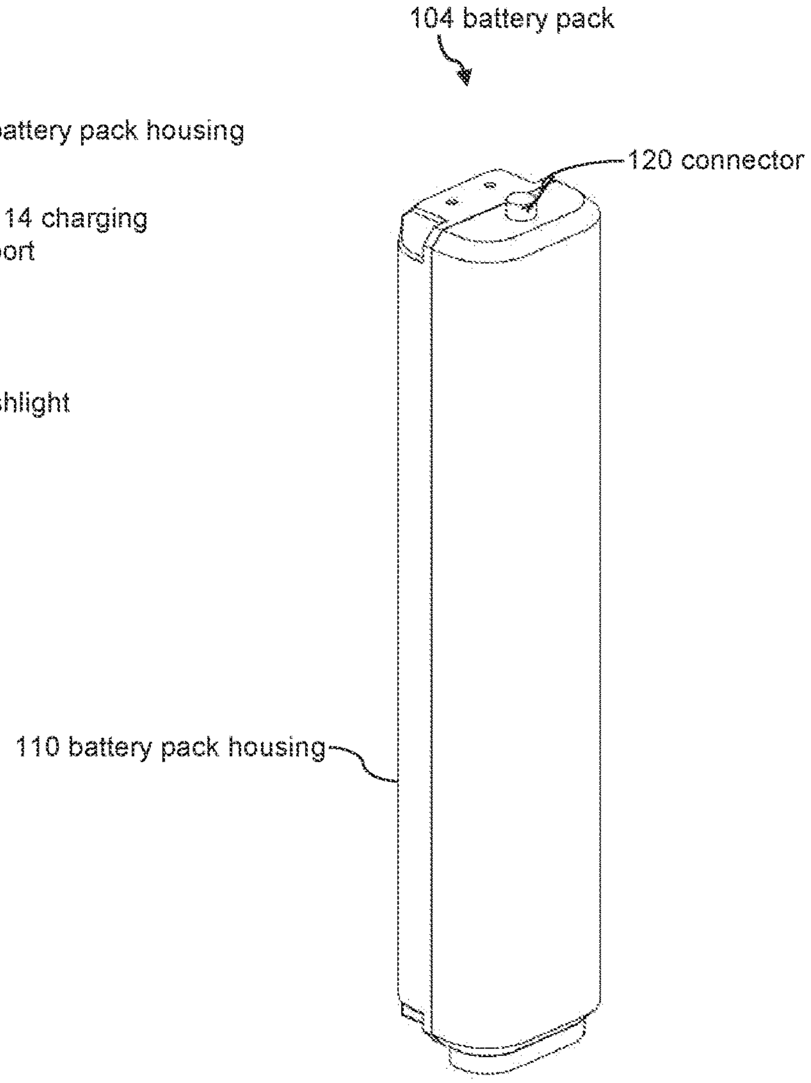

FIGS. 14A and 14B show perspective views of the battery pack 104. As illustrated in FIG. 14A, the battery pack 104 may include a charging port 114. In some embodiments, the charging port 114 is configured to receive a charging cable to thereby charge the at least one rechargeable battery within the battery pack housing 110. The charging port 114 may also be configured to receive a charging cable to thereby charge an external device, such as, but not limited to, a phone, a tablet, a speaker, a smartwatch, or any other similar rechargeable electronic device. The battery pack 104 may comprise more than one charging port 114. Rather than a charging port 114, the battery pack 104 may be configured to couple to a charging dock to thereby charge the at least one battery within the battery pack housing 110.

In some embodiments, as demonstrated in FIG. 14A, the convertible light device 100 comprises a flashlight 116 coupled to the battery pack housing 110. The battery pack 104 may comprise an activation mechanism 118 coupled to the battery pack housing 110 and operatively coupled to the flashlight 116. The activation mechanism 118 may comprise a button, a switch, or a similar mechanism configured to turn the flashlight 116 on and off. In some embodiments, as shown in FIG. 14A, the activation mechanism comprises a lens of the flashlight 116. Accordingly, the flashlight 116 may be considered a "push button," "touch," or "tap" flashlight 116, where the flashlight 116 is turned on/off by pressing the lens.

Due to the removable nature of the battery pack 104 with respect to the device housing 102, the flashlight 116 may serve as a portable light source. For example, a user may desire to use the flashlight 116 to walk a distance away from the current location of the convertible light device 100 without bringing along the entire device 100. Instead, the user may remove the battery pack 104 from the device housing 102 and utilize the flashlight 116 to walk to a restroom, into a tent, over to a vehicle, etc. As shown in FIG. 14B, the battery pack 104 may include a connector 120 located on an opposite end of the battery pack housing 110 from the flashlight 116. In some embodiments, the connector 120 is configured to contact a component within the device housing 102 to thereby electrically couple the battery pack 104 to the elongate flexible light source 106 in order to power the elongate flexible light source 106.

Removing the battery pack 104 from the device housing 102 may result in terminating light emission from the elongate flexible light source 106 until the battery pack 104 is re-coupled to the device housing 102. In some embodiments, the elongate flexible light source 106 is configured to "hold" at least a partial charge such that the battery pack 104 can be removed from the device housing 102 without immediately terminating light emission from the elongate flexible light source 106. This ability to "hold" a charge and continue emitting light even when disconnected from the battery pack 104, in combination with the ability to detach the elongate flexible light source 106 from the device housing 102 (similar to the discussion of the elongate flexible light source 16 with reference to FIG. 5) may enable a user to wear the elongate flexible light source 106. For example, a user may wrap the elongate flexible light source 106 around their torso like a belt or vest to increase visibility, such as when working, biking, walking, or jogging outdoors between sunset and sunrise. The elongate flexible light source 106 could also serve as a vest for a pet or wrap around a leash to increase visibility for both pet and owner.

Figure 15:
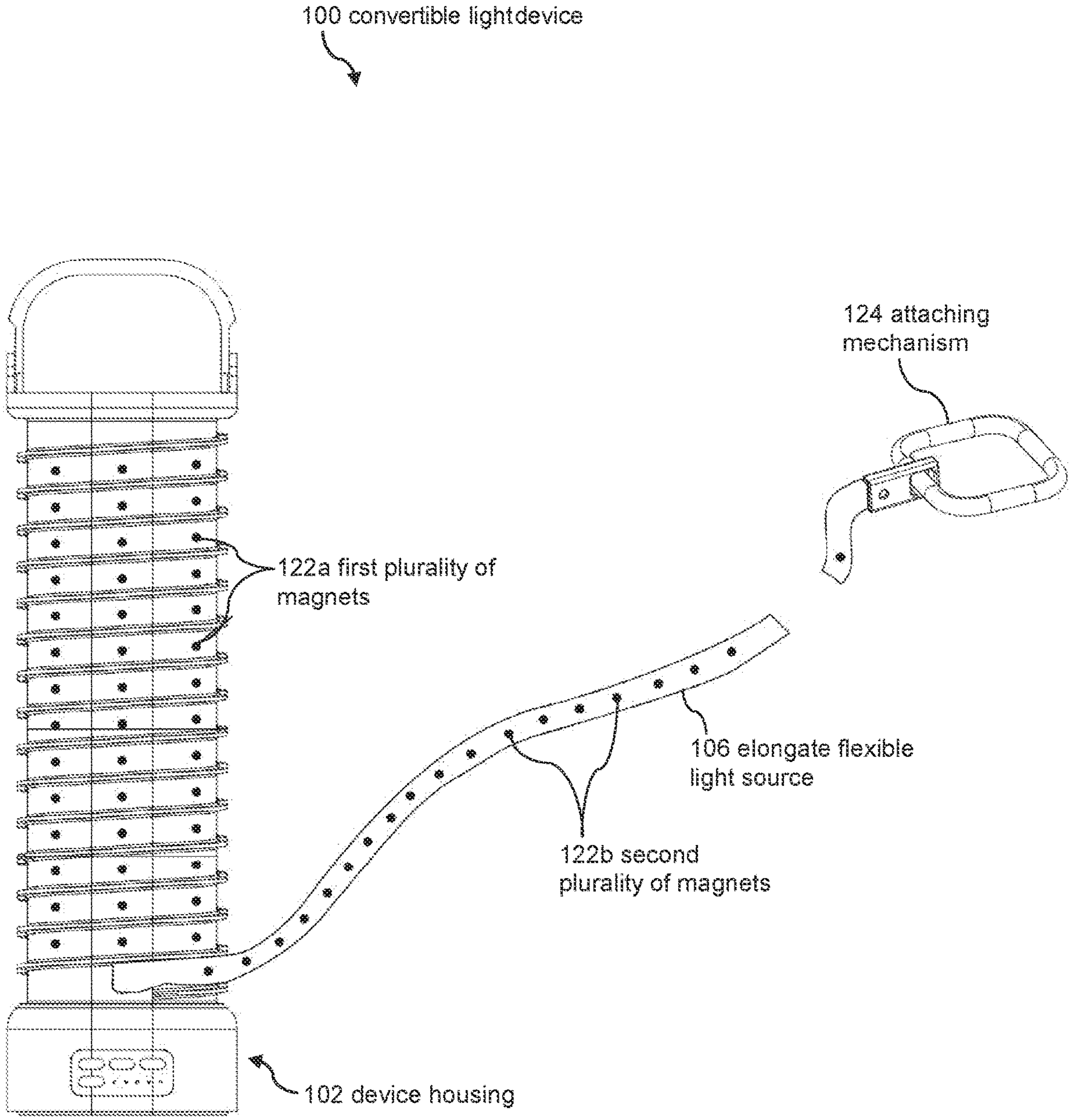
FIG. 15 illustrates a view of a convertible light device with a plurality of magnets coupled to the device housing and the elongate flexible light source, according to some embodiments.

Turning now to FIG. 15, another view of the convertible light device 100 is shown. As demonstrated, the device 100 may include a first plurality of magnets 122*a* located on the device housing 102. The device 100 may also include a second plurality of magnets 122*b* located along the elongate flexible light source 106. In some embodiments, the first plurality of magnets 122*a* is configured to magnetically couple to the second plurality of magnets 122*b*, thereby coupling the elongate flexible light source 106 to the device housing 102. To ensure magnetic coupling, the first plurality of magnets 122*a* and the second plurality of magnets 122*b* may define opposite magnetic poles. In some embodiments, the second plurality of magnets 122*b* are evenly spaced along substantially an entire length of the elongate flexible light source 106.

Having a magnetic connection may increase the ease of winding the elongate flexible light source 106 around the device housing 102, as the attraction of the second plurality of magnets 122*b* to the first plurality of magnets 122*a* may help guide the elongate flexible light source 106 into a correct position as it wraps around the device housing 102. In addition to increasing the general ease of wrapping the elongate flexible light source 106, the magnetic connection may also reduce the time to convert from "rope mode" to "lantern mode," as the user may not need to take as much time to carefully and precisely wrap the elongate flexible light source 106. Rather than needing to ensure precise positioning by hand, the magnetic connection may help guide the elongate flexible light source 106 into a correct position.

Instead of (or in addition to) the first and second plurality of magnets 122*a*, 122*b*, the convertible light device 100 may comprise an automatic winding mechanism to wind the elongate flexible light source 106 around the device housing 102. For example, the convertible light device 100 may include a retractable mechanism similar to a retractable pet leash to wrap the elongate flexible light source 106 around the device housing 102. The elongate flexible light source 106 may comprise a built-in coil to encourage shape retention of the wound-up position (i.e., "lantern mode") to increase the ease of wrapping the elongate flexible light source 106 around the device housing 102.

In some embodiments, the second plurality of magnets 122*b* is configured to couple to an external magnetic surface. For example, the second plurality of magnets 122*b* may be configured to couple to a vehicle, tent pole(s)/frame (e.g., of a pop-up canopy), a boat, a garage door, or any other magnetic surface to provide area lighting. Further, the convertible light device 100 may comprise an attaching mechanism 124 coupled to the elongate flexible light source 106, as shown in FIG. 15. Similar to the attaching mechanism 32 previously discussed in this disclosure, the attaching mechanism 124 may be configured to couple to an external anchor (e.g., a tree, fence, building, etc.) to thereby couple the elongate flexible light source 106 to the external anchor when the convertible light device 100 is in the rope mode.

Figure 16:
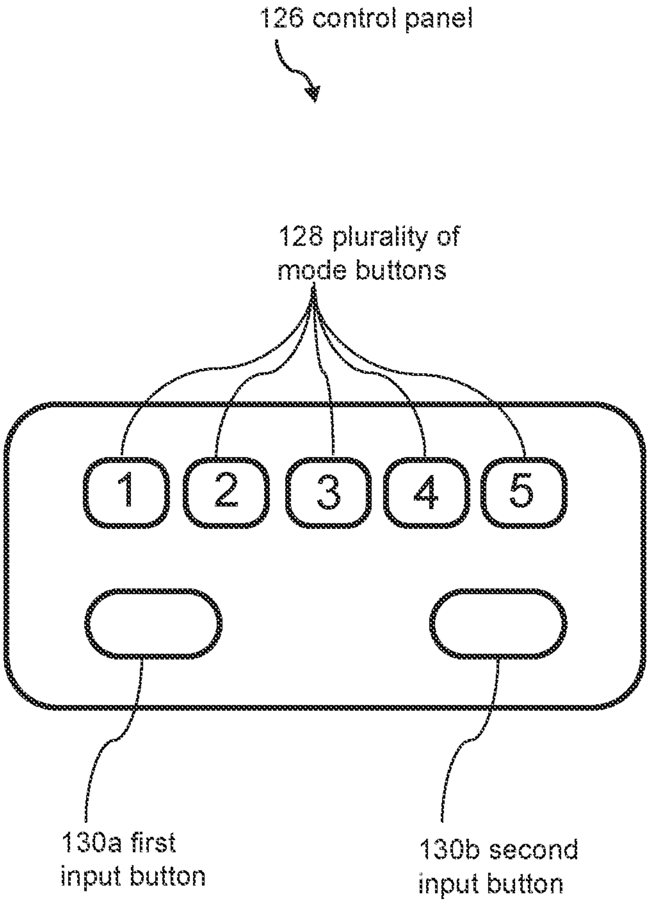
FIG. 16 illustrates a control panel with a plurality of mode buttons, according to some embodiments.

FIG. 16 illustrates a control panel 126 with a plurality of mode buttons 128, as well as a first input button 130*a* and a second input button 130*b*. In some embodiments, the control panel 126 is coupled to the device housing 102, and the plurality of mode buttons 128 is configured to control the emission of light from the plurality of LEDs of the elongate flexible light source 106. As indicated by the numbers on the plurality of mode buttons 128, the control panel 126 may include a first mode button configured to select a first light mode, a second mode button configured to select a second light mode, a third mode button configured to select a third light mode, and a fourth mode button configured to select a fourth light mode. The fifth mode button may comprise an "Other" option for light emission and may be programmed for any number of functions. For example, the fifth mode button may comprise a predetermined pattern of light emission (e.g., slow fade, fast blinking, a strobe function), a timer, or any other suitable function. Further, the first and second input buttons 130*a*, 130*b* may be configured to control light emission or some other aspect of the convertible light device 100. For example, the first and/or second input button 130*a*, 130*b* may be used to turn on/off the elongate flexible light source 106, to turn on/off the flashlight 116, to turn on/off the charging port 114, or some other function not explicitly disclosed here.

Figure 17:
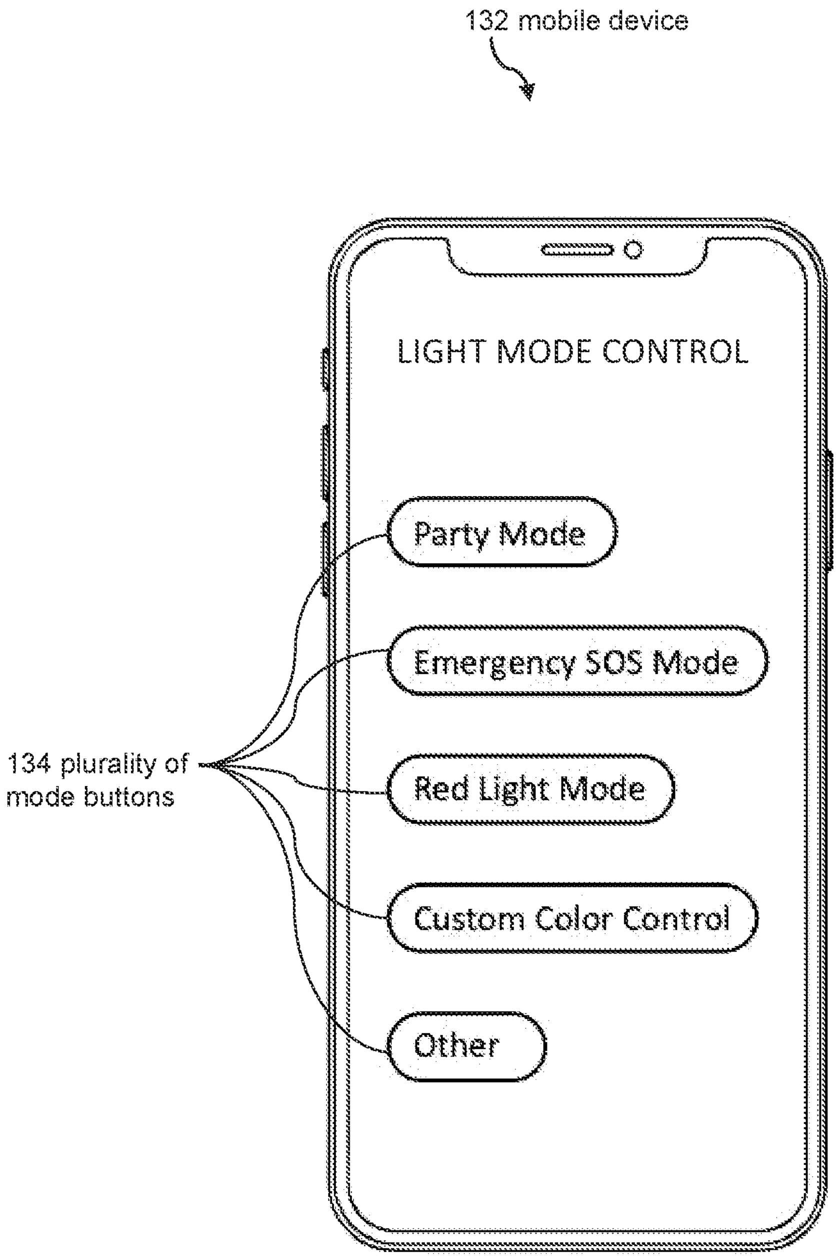
FIG. 17 illustrates a mobile device with a plurality of mode buttons, according to some embodiments.

In some embodiments, the convertible light device 100 is operatively coupled to a mobile application loaded on a mobile device 132 such as a tablet, laptop, or smartphone, as shown in FIG. 17. The mobile application may comprise a plurality of mode buttons corresponding to the plurality of mode buttons 128 located on the control panel 126. For example, moving from top to bottom on the mobile device 132, each mode listed may correspond to the numbered buttons on the control panel 126 shown in FIGS. 16. To illustrate the numbered buttons, their corresponding light modes, and the effect carried out by the plurality of LEDs of the elongate flexible light source 106, please refer to the following table:

| Button No. | Function | Effect |
|---|---|---|
| 1 | Party Mode | Follows the beat of music using a built-in equalizer and microphone |
| 2 | Emergency SOS Mode | Flashes SOS in Morse Code |
| 3 | Red Light Mode | Changes color of LED light to red |
| 4 | Custom Color Mode | Allows for customized RGB color |
| 5 | Other | Other functions |

Though discussed in terms of the elongate flexible light source 106, any of the light modes discussed herein may also be carried out via the flashlight 116.

Similar to FIGS. 7A and 7B, the control panel 126 may include a plurality of battery level indication lights and a battery level indication button, wherein the battery indication button may be configured to illuminate at least one battery level indication light of the plurality of battery level indication lights. In some embodiments, the convertible light device 100 includes multiple control panels located on the device housing 102. For example, the device 100 may include a first control panel comprising the control panel 126 illustrated in FIG. 16, and may include a second control panel similar to that shown in FIGS. 7A and 7B. It should also be noted that the mobile device 132 may be configured to display an indication of the battery level.

In some embodiments, the convertible light device 100 includes a storage compartment located within an interior portion 112 of the device housing 102. The storage compartment may be accessible via a lid removably coupled to a top portion of the device housing 102, as illustrated in FIGS. 10A and 10B with reference to the convertible light device 10. The storage compartment of the convertible light device 100 may be larger than the storage compartment 38 of the convertible light device 10. In some embodiments, the storage compartment of the convertible light device 100 is smaller than the storage compartment 38 of the convertible light device 10. The storage compartment of the convertible light device 100 may be substantially the same size as the storage compartment 38 of the convertible light device 10.

Figure 18:
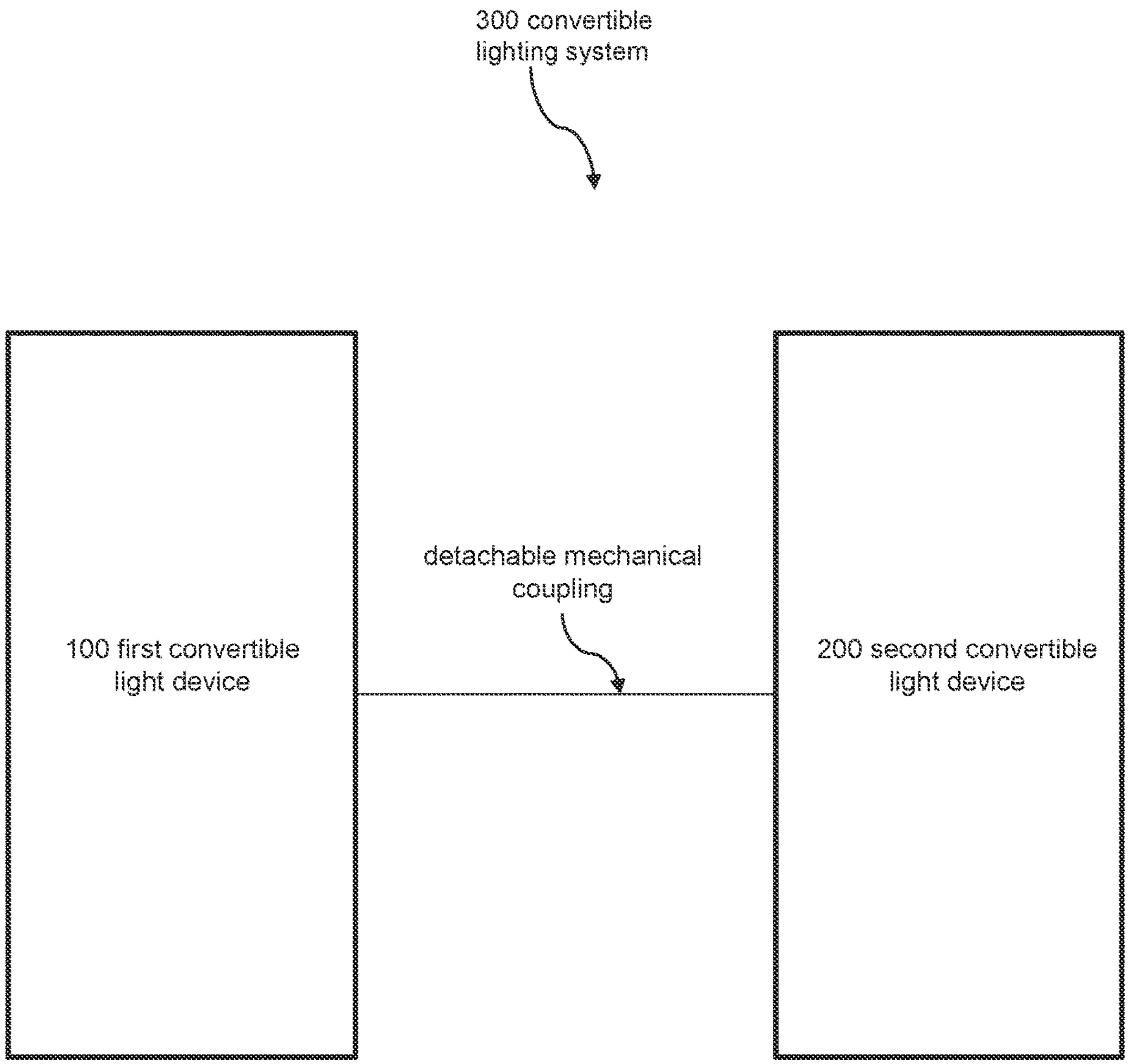
FIG. 18 illustrates a convertible lighting system with two convertible light devices detachably mechanically coupled together, according to some embodiments.
Figure 19:
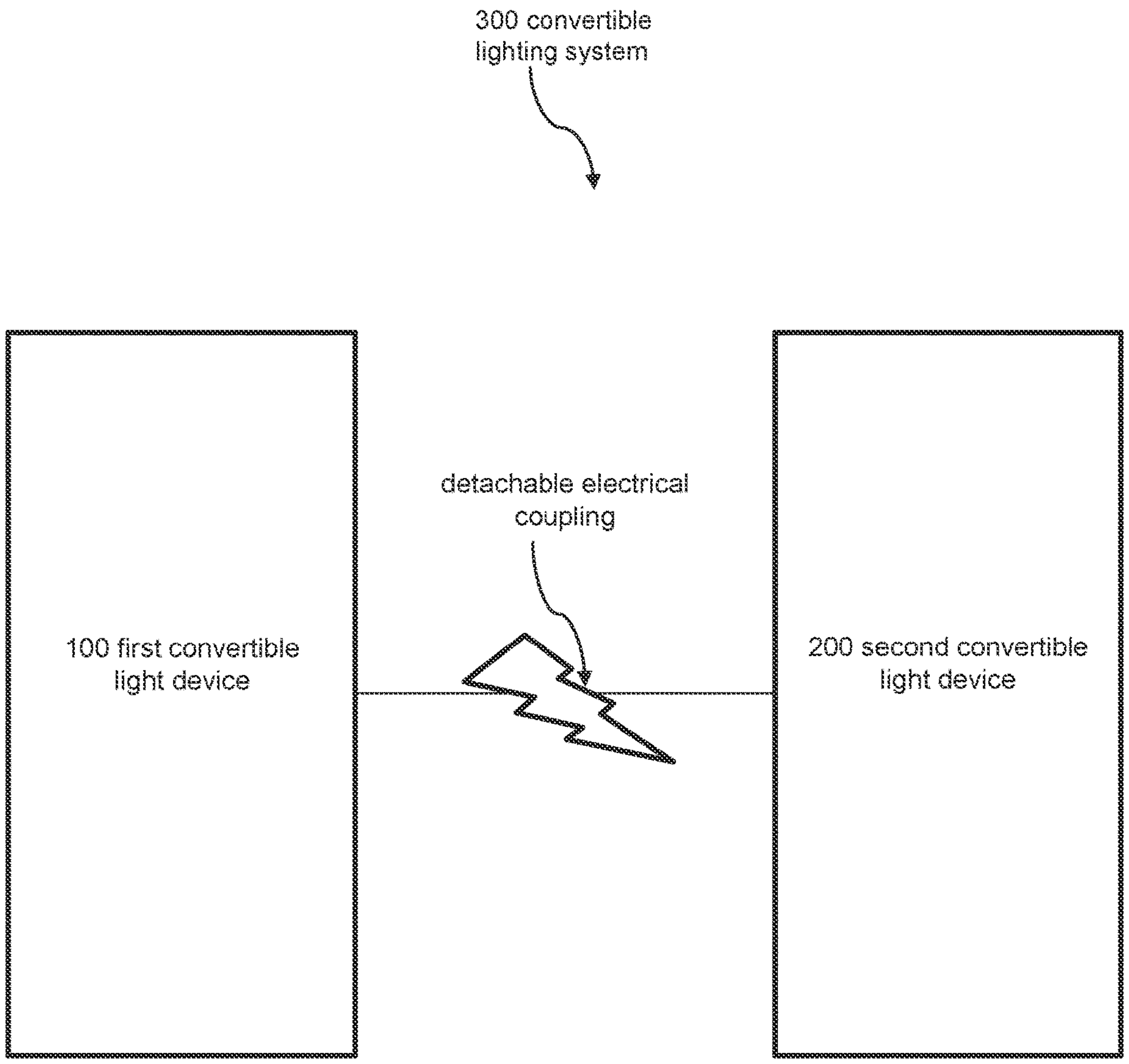
FIG. 19 illustrates a convertible lighting system with two convertible light devices detachably electrically coupled together, according to some embodiments.

As illustrated in FIGS. 18 and 19, the convertible light device 100 may be configured to couple to another convertible light device 100, such as a second convertible light device 200, forming a convertible lighting system 300. For example, a convertible lighting system 300 may comprise a first convertible light device 100 detachably electrically coupled to a second convertible light device 200. In some embodiments, the two convertible light devices are communicatively coupled such that light emission from a first elongate flexible light source 106 of the first convertible light device 100 is synced with light emission from a second elongate flexible light source 206 of a second convertible light device 200. For example, selecting the "Custom Color Mode" on the first convertible light device 100 may cause the second convertible light device 200 to emit the same custom color selection. In some embodiments, the first and second convertible light devices are detachably coupled together but operate independently. The first and second convertible light devices may be detachably mechanically coupled together.

In some embodiments, a second elongate flexible light source 206 is configured to couple to a first elongate flexible light source 106, thereby "daisy-chaining" multiple elongate flexible light sources from a single device housing 102. The second elongate flexible light source 206 may define a shorter length than the first elongate flexible light source 106. In some embodiments, the second elongate flexible light source 206 defines a longer length than the first elongate flexible light source 106. The first and second elongate flexible light sources may define substantially the same length. A single convertible light device 100 may be configured to support one, two, three, four, or more than four elongate flexible light sources coupled together. When coupled together, multiple elongate flexible light sources may be configured to emit light synchronously. Multiple elongate flexible light sources coupled together may be configured to emit light asynchronously.

The convertible light device 100 may comprise waterproof materials such that the convertible light device 100 can be used for work or recreation underwater. For example, the convertible light device 100 may be used to provide lighting for diving, watercraft maintenance, underwater photoshoots, and many other types of underwater activities. The use of waterproof materials may also enable the convertible light device 100 to withstand use in wet, though not completely submerged, environments. For example, use above deck on a watercraft, use in rainy/snowy weather, and activities like spelunking, gardening, construction, plumbing work, and many others may benefit from use of the convertible light device 100.

In some embodiments, the convertible light device 100 is configured to receive power via a power source other than the battery pack 104. For example, the convertible light device 100 may be configured to couple to a solar charger, a wind power source, or a hand-crank power source. Any number of alternative energy sources may be suitable to power the convertible light device 100.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

The term "about" is used to mean "approximately". For example, the disclosure includes "The rope may measure about 10 feet in length." In this context, "about 10 feet" is used to mean "approximately 10 feet". A range of rope length from 8 feet to 12 feet may be used to fall within the understanding of "about 10 feet".

The term "substantially" is used to mean "completely" or "nearly completely". For example, the disclosure jincludes " . . . the elongate flexible light source 16 comprises a plurality of light sources, such as LEDs, that extend substantially the entire length of the elongate flexible light source 16." In this context, "substantially the entire length" is used to mean "completely or nearly completely" the entire length. An embodiment where the plurality of light sources extend at least three-quarters of the entire length of the elongate flexible light source would fall within the understanding of "substantially the entire length".

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

What is claimed is:

1. A convertible light device, comprising:

a device housing;

a battery pack comprising a battery pack housing, the battery pack removably coupled to an interior portion of the device housing; and an elongate flexible light source detachably coupled to the device housing and electrically coupled to the battery pack, wherein the elongate flexible light source comprises a plurality of LEDs, wherein the convertible light device is configured to convert between a rope mode and a lantern mode, wherein in the lantern mode, the elongate flexible light source is configured to wrap around an exterior of the device housing, wherein in the rope mode, the elongate flexible light source is configured to unwrap and extend from the exterior of the device housing, and wherein the elongate flexible light source comprises a rope light.

2. The convertible light device of claim 1, further comprising:

a first plurality of magnets located on the device housing; and a second plurality of magnets located along the elongate flexible light source, wherein the first plurality of magnets is configured to magnetically couple to the second plurality of magnets, thereby coupling the elongate flexible light source to the device housing.

3. The convertible light device of claim 2, wherein the second plurality of magnets is configured to couple to an external magnetic surface.

4. The convertible light device of claim 3, wherein the second plurality of magnets are evenly spaced along substantially an entire length of the elongate flexible light source.

5. The convertible light device of claim 1, further comprising a flashlight coupled to the battery pack housing.

6. The convertible light device of claim 5, wherein the battery pack comprises an activation mechanism from the group consisting of a button, a switch, and combinations thereof, the activation mechanism coupled to the battery pack housing and operatively coupled to the flashlight.

7. The convertible light device of claim 5, wherein the battery pack comprises a charging port coupled to the battery pack housing, the charging port configured to couple to a charging cable to charge the battery pack.

8. The convertible light device of claim 1, further comprising a control panel coupled to the device housing, the control panel including a plurality of mode buttons configured to control an emission of light from the plurality of LEDs, wherein the plurality of mode buttons comprises a first mode button configured to select a first light mode, a second mode button configured to select a second light mode, a third mode button configured to select a third light mode, and a fourth light button configured to select a fourth light mode.

9. The convertible light device of claim 8, wherein the first light mode defines a party mode wherein the plurality of LEDs are configured to emit light in sync with a music source.

10. The convertible light device of claim 8, wherein the second light mode defines an emergency mode wherein the plurality of LEDs are configured to emit light in an "SOS" Morse Code signal.

11. The convertible light device of claim 8, wherein the third light mode defines a red light mode wherein the plurality of LEDs are configured to emit red light.

12. The convertible light device of claim 8, wherein the fourth light mode defines a custom color mode wherein the plurality of LEDs are configured to emit light in a custom color selection.

13. The convertible light device of claim 8, wherein the control panel includes a plurality of battery level indication lights and a battery indication button, wherein the battery indication button is configured to illuminate at least one battery level indication light of the plurality of battery level indication lights.

14. The convertible light device of claim 1, further comprising a storage compartment located within an interior portion of the device housing, wherein the storage compartment is accessible via a lid removably coupled to a top portion of the device housing.

15. A convertible lighting system, comprising:

a first convertible light device including a first device housing, a first battery pack comprising a first battery pack housing, the first battery pack removably coupled to an interior portion of the first device housing, a first flashlight coupled to the first battery pack housing, and a first elongate flexible light source detachably coupled to the first device housing and electrically coupled to the first battery pack, wherein the first elongate flexible light source comprises a first plurality of LEDs; and a second convertible light device including a second device housing, a second battery pack comprising a second battery pack housing, the second battery pack removably coupled to an interior portion of the second device housing, a second flashlight coupled to the second battery pack housing, and a second elongate flexible light source detachably coupled to the second device housing and electrically coupled to the second battery pack, wherein the second elongate flexible light source comprises a second plurality of LEDs, wherein the first convertible light device is configured to electrically couple to the second convertible light device, wherein the first convertible light device and the second convertible light device are each configured to convert between a rope mode and a lantern mode, wherein in the lantern mode, the first elongate flexible light source is configured to wrap around an exterior of the first device housing, and the second elongate flexible light source is configured to wrap around an exterior of the second device housing, wherein in the rope mode, the first elongate flexible light source is configured to unwrap and extend from the exterior of the first device housing, and the second elongate flexible light source is configured to unwrap and extend from the exterior of the second device housing, and wherein the first elongate flexible light source comprises a first rope light and the second elongate flexible light source comprises a second rope light.

16. The convertible lighting system of claim 15, wherein the second elongate flexible light source is configured to detach from the second device housing and electrically couple to the first elongate flexible light source.

17. The convertible lighting system of claim 15, wherein the first elongate flexible light source defines a first length and the second elongate flexible light source defines a second length that is different than the first length.

18. The convertible lighting system of claim 15, wherein the first convertible light device further comprises:

a first plurality of magnets located on the first device housing; and a second plurality of magnets located along the first elongate flexible light source, wherein the first plurality of magnets is configured to magnetically couple to the second plurality of magnets, thereby coupling the first elongate flexible light source to the first device housing.

19. The convertible lighting system of claim 15, wherein the second convertible light device further comprises:

a first plurality of magnets located on the second device housing; and a second plurality of magnets located along the second elongate flexible light source, wherein the first plurality of magnets is configured to magnetically couple to the second plurality of magnets, thereby coupling the second elongate flexible light source to the second device housing.

20. The convertible lighting system of claim 15, wherein the first convertible light device includes a first storage compartment located within an interior portion of the first device housing, wherein the first storage compartment is accessible via a first lid removably coupled to a top portion of the first device housing, and wherein the second convertible light device includes a second storage compartment located within an interior portion of the second device housing, wherein the second storage compartment is accessible via a second lid removably coupled to a top portion of the second device housing.

* * * * *